United States Patent
Uno

(10) Patent No.: US 9,242,302 B2
(45) Date of Patent: Jan. 26, 2016

(54) CUTTING TOOL HOLDER, CUTTING TOOL, AND METHOD OF MANUFACTURING MACHINED PRODUCT USING THE SAME

(75) Inventor: Tetsuya Uno, Yasu (JP)

(73) Assignee: Kyocera Corporation, Kyoto (JP)

( * ) Notice: Subject to any disclaimer, the term of this patent is extended or adjusted under 35 U.S.C. 154(b) by 791 days.

(21) Appl. No.: 13/515,427

(22) PCT Filed: Dec. 14, 2010

(86) PCT No.: PCT/JP2010/072465
§ 371 (c)(1),
(2), (4) Date: Jun. 12, 2012

(87) PCT Pub. No.: WO2011/074571
PCT Pub. Date: Jun. 23, 2011

(65) Prior Publication Data
US 2012/0260778 A1    Oct. 18, 2012

(30) Foreign Application Priority Data

Dec. 14, 2009  (JP) ................................ 2009-283322
Feb. 26, 2010  (JP) ................................ 2010-042988

(51) Int. Cl.
B23B 27/04       (2006.01)
B26D 3/06        (2006.01)
B23B 29/04       (2006.01)

(52) U.S. Cl.
CPC ............ *B23B 29/043* (2013.01); *B23B 29/046* (2013.01); *B23B 2205/02* (2013.01); *B23B 2260/124* (2013.01); *B23B 2260/132* (2013.01); *Y10T 82/10* (2015.01); *Y10T 407/2282* (2015.01)

(58) Field of Classification Search
CPC .............. B23B 2205/12; B23B 29/043; B23B 2205/02; Y10T 407/2282; Y10T 407/227
USPC .............. 407/91, 117, 110, 50, 109, 107, 111
See application file for complete search history.

(56) References Cited

U.S. PATENT DOCUMENTS 4,332,513 A * 6/1982 Gowanlock .................. 407/101
4,632,614 A * 12/1986 Rall et al. ..................... 409/233

(Continued)

FOREIGN PATENT DOCUMENTS

JP   2001-001204    1/2001
JP   2001-246506    9/2001

(Continued)

OTHER PUBLICATIONS

Japanese Office Action, Japanese Patent Application No. 2011-546129, and Statement of Relevance of Non-English References, Aug. 27, 2013, 3 pp.

*Primary Examiner* — Sunil K Singh
*Assistant Examiner* — Sara Addisu
(74) *Attorney, Agent, or Firm* — Volpe and Koenig, P.C.

(57) ABSTRACT

A cutting tool holder includes a pressing member with a pressing part and an inserting part, a holder body, a head member including a first fixing section which is divided into a first front end region and a first rear end region, and has a first fixing hole for inserting the inserting part of the pressing member and a contact part pressed by the pressing part of the pressing member, at a portion of a first surface close to the first front end region in reference to the first rear end region; and a second fixing section divided into a second front end region and a second rear end region in which the first rear end region of the first fixing section and the second rear end region are connected to each other so that a fixing space extending from the second rear end region to the second front end region is located between the second fixing section and a second surface different from the first surface in the first fixing section. The contact part includes a first contact portion located close to the first rear end region and a second contact portion located close to the first front end region in reference to a midpoint of the first fixing hole. An area of the second contact portion is larger than an area of the first contact portion. A cutting tool including the cutting tool holder, and a method of manufacturing a machined product using the cutting tool are also provided.

20 Claims, 14 Drawing Sheets

(56) References Cited

U.S. PATENT DOCUMENTS

| | | | |
|---|---|---|---|
| 5,112,164 A * | 5/1992 | Pano | 407/110 |
| 6,186,704 B1 | 2/2001 | Hale | |
| 7,217,068 B2 * | 5/2007 | Oettle | 407/101 |
| 7,246,974 B2 * | 7/2007 | Hansson et al. | 407/109 |
| 7,896,585 B2 * | 3/2011 | Hecht | 407/110 |
| 8,104,999 B2 * | 1/2012 | Hecht | 407/110 |
| 2005/0129471 A1 * | 6/2005 | Englund | 407/101 |
| 2007/0110526 A1 * | 5/2007 | Nicholas | 407/110 |
| 2007/0207671 A1 * | 9/2007 | Nagaya et al. | 439/607 |
| 2008/0003068 A1 * | 1/2008 | Nagaya et al. | 407/110 |
| 2009/0016830 A1 | 1/2009 | Nicholas | |
| 2010/0178117 A1 * | 7/2010 | Watanabe et al. | 407/11 |
| 2010/0266352 A1 | 10/2010 | Nagaya et al. | |

FOREIGN PATENT DOCUMENTS

| | | |
|---|---|---|
| JP | 2002-538010 | 11/2002 |
| JP | 2008-6557 | 1/2008 |
| JP | 2009107071 | 5/2009 |
| JP | 2009-528175 | 8/2009 |
| SU | 462662 A * | 6/1975 |
| WO | WO 00/51768 | 9/2000 |
| WO | WO 2005084947 A1 * | 9/2005 |
| WO | WO 2007/100907 A2 | 9/2007 |

* cited by examiner

CUTTING TOOL HOLDER, CUTTING TOOL, AND METHOD OF MANUFACTURING MACHINED PRODUCT USING THE SAME

TECHNICAL FIELD

The present invention relates to a cutting tool holder, a cutting tool, and a method of manufacturing a machined product using the same, which are used for cutting processing of metal components or the like.

BACKGROUND ART

Cutting tools used for grooving, cutoff process, or the like of metal components or the like have conventionally been known. For example, as shown in FIG. 1 of Japanese Unexamined Patent Application Publication No. 2001-001204, the cutting tool includes a configuration for fixing a cutting insert (hereinafter referred to as an "insert" in some cases) to between a lower jaw and an upper jaw of a cutting tool holder (hereinafter referred to as a "holder" in some cases) by inserting a screw from an upper part of the holder to a vertical lower side, and by pressing down the upper jaw of the holder.

However, when the cutting processing is carried out using the foregoing cutting tool, a pressing force by the screw is insufficient, and hence there is a risk that the insert cannot sufficiently be fixed thereto.

For example, a cutting tool having a configuration in which a tool holder 10a and a clamp 10b are fixed with a socket bolt 16 has also been disclosed, as shown in FIG. 1 of Japanese Unexamined Patent Application Publication No. 2009-526175.

However, according to this cutting tool, there has been the following risk. That is, chatter vibration occurs between the tool holder 10a and the clamp 10b by thrust force applied from the clamp 10b to the tool holder 10a during the cutting processing at a large feed rate, and the chatter vibration deteriorates machining accuracy with respect to a workpiece. The chatter vibration can also contribute to fractures of the insert and the clamp 10b.

SUMMARY OF THE INVENTION

An embodiment of the present invention provides a cutting tool holder and a cutting tool for achieving stable fixation of a cutting insert, and a method of manufacturing a machined product using the same.

Another embodiment of the present invention provides a cutting tool holder and a cutting tool for achieving improved machining accuracy with respect to a workpiece, and a method of manufacturing a machined product using the same.

A cutting tool holder according to one embodiment of the present invention includes a pressing member including a pressing part and an inserting part; a holder body; and a head member including a first fixing section and a second fixing section. The first fixing section is divided into a first front end region and a first rear end region, and has a first fixing hole for inserting the inserting part of the pressing member and a contact part pressed by the pressing part of the pressing member, at a portion of a first surface close to the first front end region in reference to the first rear end region. The second fixing section is divided into a second front end region and a second rear end region. In the second fixing section, the first rear end region of the first fixing section and the second rear end region are connected to each other so that a fixing space extending from the second rear end region to the second front end region is located between the second fixing section and a second surface different from the first surface in the first fixing section. The contact part includes a first contact portion located close to the first rear end region and a second contact portion located close to the first front end region in reference to a midpoint of the first fixing hole. An area of the second contact portion is larger than an area of the first contact portion.

A cutting tool holder according to another embodiment of the present invention includes a pressing member including a pressing part and an inserting part; a holder body including a first fixing hole for inserting the inserting part of the pressing member; and a head member including a first fixing section and a second fixing section. The first fixing section is divided into a first front end region and a first rear end region, and includes a contact part pressed by the pressing part of the pressing member, at a portion of a first surface close to the first front end region in reference to the first rear end region. The second fixing section is divided into a second front end region and a second rear end region, in the second fixing section, the first rear end region of the first fixing section and the second rear end region axe connected to each other so that a fixing space extending from the second rear end region to the second front end region is located between the second fixing section and a second surface different from the first surface in the first fixing section. The contact part includes a first contact portion located close to the first rear end region and a second contact portion located close to the first front end region in reference to a midpoint of the first fixing hole. An area of the second contact portion is larger than an area of the first contact portion.

A cutting tool holder according to still another embodiment of the present invention includes a pressing member including a pressing part and an inserting part; a first fixing section; and a second fixing section. The first fixing section is divided into a first front end region and a first rear end region, and includes a first fixing hole for inserting the inserting part of the pressing member and a contact part pressed by the pressing part of the pressing member, at a portion of a first surface close to the first front end region in reference to the first rear end region. The second fixing section is divided into a second front end region and a second rear end region. In the second fixing section, the first rear end region of the first fixing section and the second rear end region are connected to each other so that a fixing space extending from the second rear end region to the second front end region is located between the second fixing section and a second surface different from the first surface in the first fixing section. The contact part includes a first contact portion located close to the first rear end region and a second contact portion located close to the first front end region in reference to a midpoint of the first fixing hole. An area of the second contact portion is larger than an area of the first contact portion.

In a cutting tool holder according to yet another embodiment of the present invention, the holder body is divided into a holder front end region and a holder rear end region including a wide part protruding in a width direction with respect to the holder front end region in a top view. The holder body includes a first serration part and at least one hole portion on a side surface close to the wide part in the holder front end region. The head member includes a second serration part which is located on a first side surface and is engaged with the first serration part, and at least one through hole extending from the first side surface to a second side surface located opposite the first side surface. A head rear end region is contacted with an end portion of the wide part close to the holder front end region. The cutting tool holder further includes a fixing member lying from inside of the at least one hole portion to inside of the at least one through hole. A central axis of the at least one through hole is eccentric toward the holder front end region of the holder body with respect to a central axis of the at least one hole portion.

In the cutting tool holder according to a further embodiment of the present invention, the holder body is divided into a holder front end region and a holder rear end region including a wide part protruding in a width direction with respect to the holder front end region in a top view. The holder body includes a first serration part and at least one hole portion on a side surface close to the wide part in the holder front end region. The head member includes a second serration part which is located on a first side surface and is engaged with the first serration part, and at least one through hole extending from the first side surface to a second side surface located opposite the first side surface. A head rear end region is contacted with an end portion of the wide part close to the holder front end region. The cutting tool holder further includes a fixing member lying from inside of the at least one hole portion to inside of the at least one through hole. The head member includes a pressed surface pressed by the fixing member. The pressed surface is inclined toward the head rear end region from the first side surface to the second side surface.

A cutting cool according to an embodiment of the present invention includes the cutting tool holder, and an insert including a fixed part contacted with the first fixing section and the second fixing section in the fixing space, and a cutting part located outward of the first front end region as compared to the fixing space.

A method of manufacturing a machined product according to an embodiment of the present invention include rotating a workpiece; bringing the workpiece being rotated and the cutting part of the cutting tool into contact with each other; and separating the workpiece and the cutting tool from each other.

In the cutting tool holder and the cutting tool according to the one embodiment of the present invention, a force that the pressing member presses against the first fixing section acts more strongly on the first front end region than on the first rear end region of the first fixing section. Therefore, the pressing force of the pressing member can be effectively used as a force for fixing the insert, thereby improving fixation reliability of the insert.

In the cutting tool holder and the cutting tool according to the another embodiment of the present invention, the central axis of the through hole is eccentric to the holder front end region of the holder body with respect to the central axis of the hole portion, or the pressed surface pressed by the fixing section in the head member is inclined toward the head rear end region from the first side surface to the second side surface. Therefore, when the holder body and the head member are fixed together by the fixing member, the head member receives a force that moves to the head rear end region relative to the holder body, and the head rear end region of the head member is strongly contacted with the end portion of the wide part of the holder body close to the holder front end region, thereby improving fixation strength between the two. It is therefore capable of reducing chatter vibration between the head member and the holder body due to thrust force caused during cutting processing. This achieves an improvement of machining accuracy with respect to the workpiece. Particularly, an excellent effect can be produced under high feed conditions in which the thrust force becomes large.

BRIEF DESCRIPTION OF THE DRAWINGS

FIG. 2(a) is a perspective view thereof; FIG. 2(b) is a top view thereof; and FIG. 2(c) is a cross-sectional view taken along the line A-A of FIG. 2(b) (including a side view of a pressing member);

FIG. 3(a) is a perspective view thereof; and FIG. 3(b) is a top view thereof;

FIG. 4(a) is a perspective view thereof; FIG. 4(b) is a top view thereof;

FIG. 5(a) is a perspective view thereof; FIG. 5(b) is a top view thereof; FIG. 5(c) is a side view thereof;

FIG. 6(a) is a perspective view thereof; FIG. 6(b) is a top view thereof; FIG. 6(c) is a cross-sectional view taken along the line B-B of FIG. 6(b) (including a side view of a pressing member);

FIG. 8(a) is a side view thereof; FIG. 8(b) is a top view thereof;

FIG. 9(a) is a perspective view thereof; FIG. 9(b) is a top view thereof;

FIG. 10(a) is a perspective view thereof; FIG. 10(b) is a top view thereof; FIG. 10(c) is a side view thereof;

FIG. 11(a) is a perspective view thereof; FIG. 11(b) is a top view thereof; FIG. 11(c) is a side view thereof;

PREFERRED EMBODIMENTS FOR CARRYING OUT THE INVENTION

<Cutting Tool Holder and Cutting Tool>
(First Embodiment)

A first embodiment of a cutting tool holder and a cutting tool of the present invention is described in detail below with reference to FIGS. 1 and 2.

Figure 1:
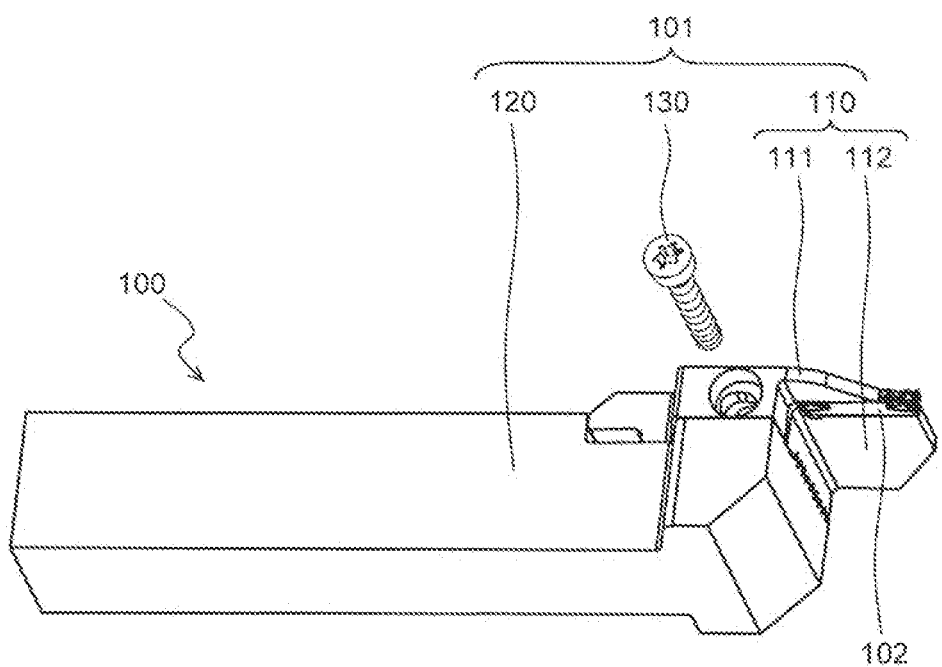
FIG. 1 is exploded perspective view showing a cutting tool according to a first embodiment of the present invention.
Figure 2:
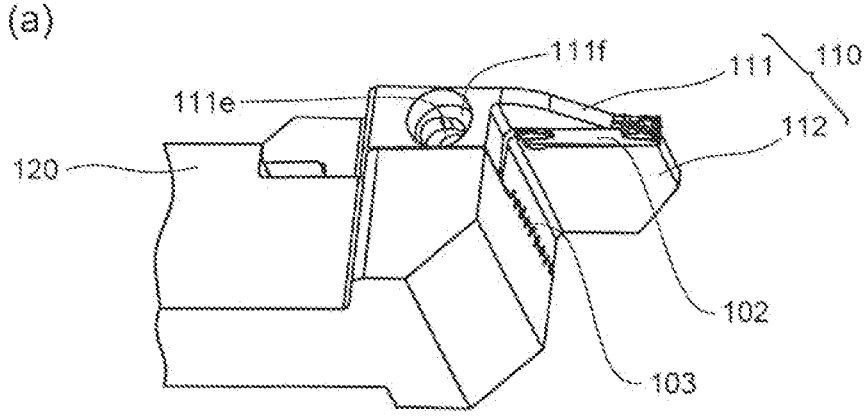
FIG. 2 is a partially enlarged view showing in enlarged dimension a front end portion of the cutting tool shown in FIG. 1: specifically.
Figure 2:
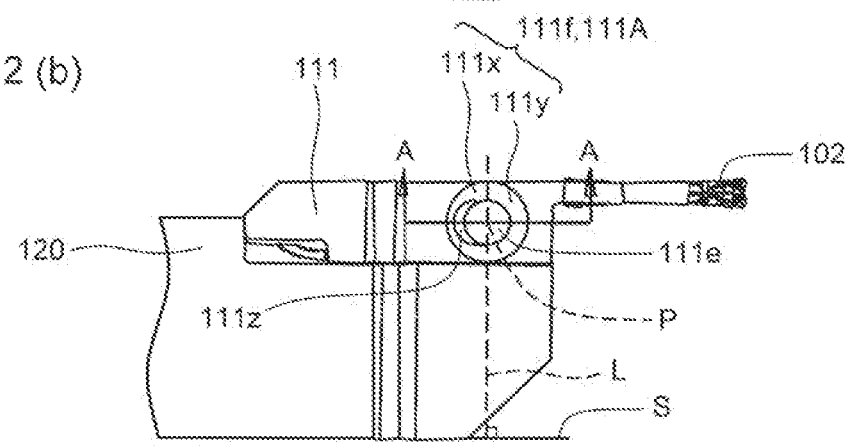
Figure 2:
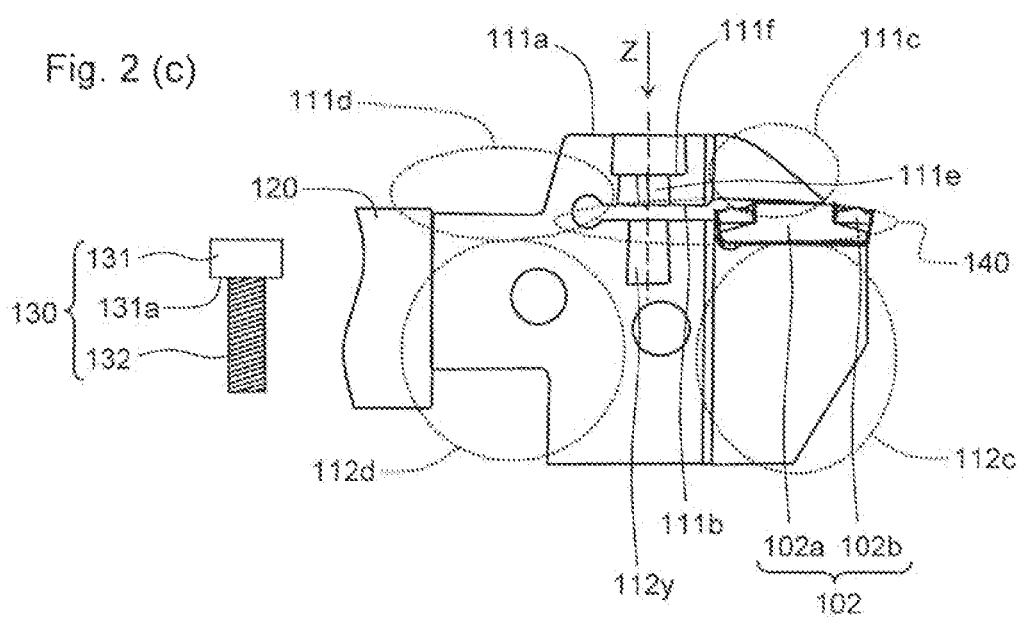

As shown in FIGS. 1 and 2, the cutting tool 100 of the present embodiment generally includes a holder 101 and an insert 102. The holder 101 includes a head member 110 having a first fixing section 111 (upper jaw) and a second fixing section 112 (lower jaw), a holder body 120, and a pressing member 130. The cutting tool 100 of the present embodiment is a so-called indexable tool in which the insert 102 is detachably attached to the holder 101. Individual components are described in due order below.

The head member 110 includes the first fixing section 111 and the second fixing section 112, and has the function of fixedly holding the insert 102 between the first fixing section 111 and the second fixing section 112. Preferably, the head member 110 has a shape that allows the head member to follow the insert 102 and enter the inside of a groove of a workpiece when grooving of the workpiece is carried out by the cutting tool 100. In the present embodiment, as shown in FIG. 2, a connection structure of the first fixing section 111 and the second fixing section 112 is configured with a single member (integration). Instead of this, the first fixing section 111 and the second fixing section 112 that are separated members may be connected to each other by a screw or the like. This is similarly true for the following other embodiments.

In the first fixing section 111 and the second fixing section 112, the first fixing section 111 has the function of fixing the insert 102 from above. As a specific configuration, the first fixing section 111 is divided into a first front end region 111c and a first roar end region 111d, and has a first surface 111a, as shown in FIG. 2(c). In the present specification, the phrase "first surface 111a" denotes an upper surface of the first fixing section 111. In FIG. 2, though the individual regions such as the first front end region 11c are respectively surrounded by a dotted line, these areas surrounded by the dotted line schematically indicate the positions of the individual regions, but do not strictly specify the individual regions. This is similarly true foe other drawings.

The first fixing section 111 has a first fixing hole 111e for inserting an inserting part 132 of a pressing member 130, and a contact part 111f to be pressed by a pressing part 131 of the pressing member 130, at a portion of the first surface 111a close to the first front end region 111c In reference to the first rear end region 111d. In the present specification, the phrase "contact part" denotes the part used for pressing by the pressing part of the pressing member. Depending on a relationship between the shape of the contact part and the shape of the pressing part of the pressing member, only an inside portion of the contact part may be pressed, and the rest may not be pressed.

In the present embodiment, the first fixing hole 111e extends up and down (in a vertical direction) from the first fixing section 111 to the second fixing section 112 of the cutting tool 100. The contact part 111f of the first surface 111a is a flat surface perpendicular to an insertion direction of the pressing member 130 in the first fixing hole 111e.

As shown in FIG. 2(b), the contact part 111f includes a first contact portion 111x located close to the first rear end region 111d, and a second contact portion 111y located close to the first front end region 111c in reference to a midpoint P of the first fixing hole 111e. In the present specification, the phrase "in reference to the midpoint P of the first fixing hole 111e" denotes in reference to a line L which passes through the midpoint P of the first fixing hole 111e and is substantially orthogonal to a side surface of the holder body 120 or a surface S obtained by extending the side surface in a top view.

In the present embodiment, at least a part of the first contact portion 111x is overlapped with a fixing space 140 for fixing the insert 102 in a perspective view from the first surface 111a of the first fixing section 111. More specifically, the entirety of the first contact portion 111x is overlapped with the fixing space 140 in the perspective view from the first surface 111a of the first fixing section 111.

On the other hand, the second fixing section 112 has the function of fixing the insert 102 from below. As a specific configuration, the second fixing section 112 is divided into a second front end region 112c and a second rear end region 112d as shown in FIG. 2(c). In the second fixing section 112, the first rear end region 111d of the first fixing section 111 and the second rear end region 112d are integrated with each other so that the fixing space 140 extending from the rear end region 112d to the second front end region 112c is located between the second fixing section 112 and a second surface 111b of the first fixing section 111.

In the present specification, the first front end region and the second front end region are collectedly referred to as "head front end region," and the first rear end region and the second rear end region are collectedly referred to as "head rear end region" in some cases. In the present embodiment, the first front end region 111c and the second front end region 112c are collectedly referred to as "head front end region," and the first rear end region 111d and the second rear end region 112d are collectedly referred to as "head rear end region" in some cases. Also in the present specification, the phrase "second surface 111b" denotes a lower surface of the first fixing section 111 located opposite the first surface 111a.

The pressing member 130 includes the pressing part 131 and the inserting part 132, as shown in FIG. 2(c). The pressing member 130 is inserted into the first fixing hole 111e of the first fixing section 111 in a direction of arrow Z, and functions to narrow down the fixing space 140 between the first fixing section 111 and the second fixing section 112 of the head member 110, and then functions to grip and fix the insert 102 positioned in the fixing space 140, by a force that the pressing part 131 presses against the contact part 111f of the first fixing section 111.

In the present embodiment, the pressing against the contact part 111f by the pressing part 131 of the pressing member 130 is carried out as follows. That is, the first fixing hole 111e of the first fixing section 111 extends from the first surface 111a to the second surface 111b. Oh the other hand, the second fixing section 112 further includes a second fixing hole 112y that is continuous with the first fixing hole 111e with the fixing space 140 interposed therebetween, as shown in FIG. 2(c). The second fixing hole 112y is a screw hole opening into the surface of the second fixing section 112 opposed to the second surface 111b of the first fixing section 111. Therefore, the contact part 111f can be pressed by the pressing part 131 by inserting the pressing member 130 into the first fixing hole 111e, and by screwing a front end of the inserting part 132 into the second fixing hole 112y.

No special limitation is imposed on the pressing member 130 insofar as it can execute the foregoing functions in a shape including the pressing part 131 and the inserting part 132. Examples thereof include screws, such as a clamp screw, and a bolt and a nut. This is similarly true for a fixing member 450 described later in the following fourth and fifth embodiments. In the present embodiment, a surface 131a (contact surface) close to a lower side (the inserting part 132) of the pressing part 131 of the pressing member 130 is a flat surface perpendicular to a central axis of the inserting part 132.

The insert 102 is a member having the function of cutting a workpiece by a cutting part 102b. As shown in FIG. 2(c), the insert 102 includes a fixed part 102a contacted with the first fixing section 111 and the second fixing section 112, and the cutting part 102b located outward of the first front end region 111c as compared to the fixing space 140.

The holder body 120 has the function of fixing the head member 110. In the present embodiment, the holder body 120 and the head member 110 are fixed to each other by using an unshown fixing member, such as a screw member, in a state in which a side surface of the holder body 120 and a side surface of the head member 110, both of which are opposed to each ether, are placed in contact with each other.

As described above, the contact part 111f pressed by the pressing part 131 of the pressing member 130 includes the first contact portion 111x and the second contact portion 111y. In the present embodiment, an area of the second contact portion 111y is configured to be larger than an area of the first contact portion 111x. That is, as shown in FIG. 2(b), when the cutting tool 100 is seen through from the first surface 111a of the first fixing section 111, the first fixing section 111 has a flank part 111z in a contact region 111A in which the pressing part 131 and the first surface 111a are overlapped with each other, specifically, at a portion of the contact region 111A closer to the first rear end region 111d than the midpoint P of the first fixing hole 111e. In the present specification, the phrase "flank part 111z" denotes a chamfering part. In the present embodiment, the flank part 111z is located at the portion of the contact region 111A, and therefore, a contact area in the first rear end region 111d (an area of the first contact portion 111x) is decreased according to an area corresponding to the flank part 112, as compared to a contact area in the first front end region 111c (an area of the second contact portion 111y). In the present specification, the phrase "contact region" denotes a region that is a portion of the contact part and is actually pressed by the pressing part of the pressing member.

The cutting tool 100 of the present embodiment has the foregoing configurations. Therefore, the force that the pressing member 130 presses against the first fixing section 111 becomes stronger in the first front end region 111c of the first fixing section 111 than in the first rear end region 111d thereof. This allows the pressing force of the pressing member 130 to be effectively used as a force for fixing the insert 102, thereby improving fixation reliability of the insert 102.

In the present embodiment, a width of the first front end region 111c in the first fixing section 111, and a width of the second front end region 112c in the second fixing section are respectively smaller than a width of the insert 102 (refer to FIG. 2(b)). In the first fixing section 111 and the second fixing section 112, a width of the head front end region for gripping the insert 102 is smaller than the width of the insert 102. This makes it easier for the head member 110 to follow the insert 102 and enter the groove of the workpiece when the grooving of the workpiece is carried out by the cutting tool 100. In the present specification, the phase "width of the insert 102" denotes a largest width in the width of the cutting part 102b.

In the present embodiment, the head member 110 and the holder body 120 respectively include a serration part 103 (refer to FIG. 2(a)) extending from the front end region (the first front end region 111c and the second front end region 112c) to the rear end region (the first rear end region 111d and the second rear end region 112d). In the present specification, the phrase "serration part" denotes sawtooth-shaped irregularities. In the present embodiment, the head member 110 and the holder body 120 are fixed together by two screw members (fixing members) with their respective serration parts 103 engaged with each other. This shape is the same as that of the cutting tool shown in FIG. 5.

To be specific, the centers of the two screw holes formed in the holder body 120 and the centers of screw insertion holes formed in the head member 110 are decentered. Hence, as the screws are fastened, the head rear end region of the head member 110 is pressed against a corresponding constraining part of the holder body 120. Therefore, the force that the pressing member 130 presses against the first fixing section 111 can be effectively used for fixing the insert 102 to the head member 110 without being used for fixing the head member 110 and the holder body 120 to each other. The serration part 103 of the head member 110 is formed in the second fixing section 112.

Several embodiments of the holder and the cutting tool according to the present invention are described below. In the following embodiments, descriptions of the same components as the foregoing first embodiment are omitted, and the following description is focused on components different from those of the first embodiment.

(Second Embodiment)

Figure 3:
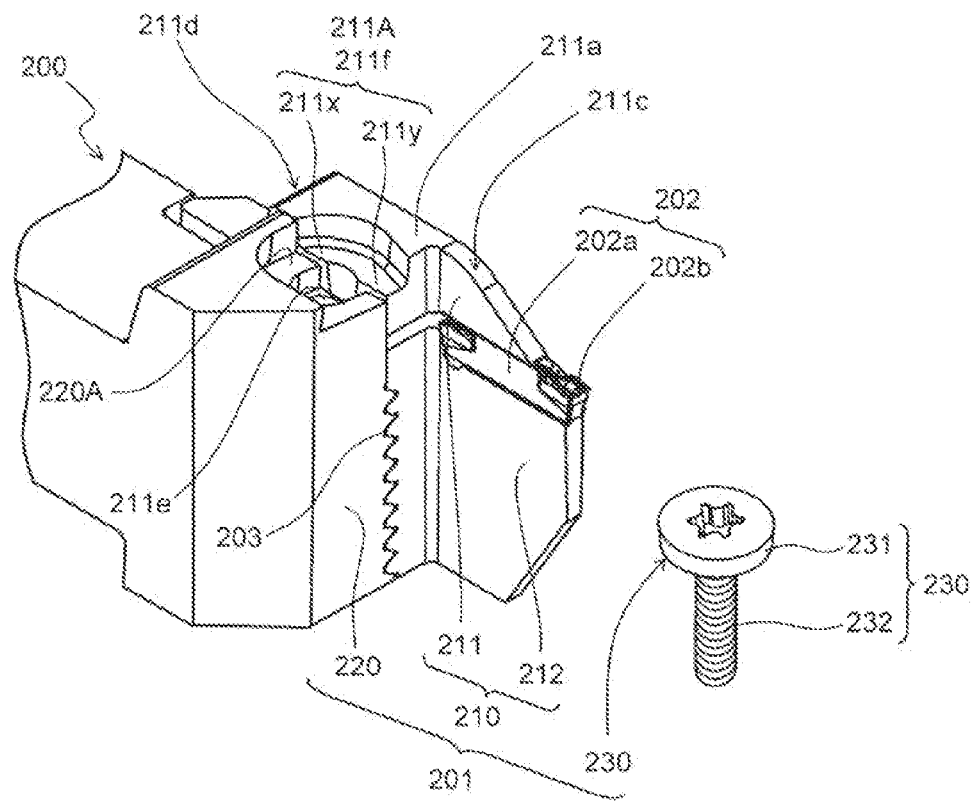
FIG. 3 is a partially enlarged view showing in enlarged dimension a front end portion of a cutting tool according to a second embodiment of the present invention: specifically.
Figure 3:
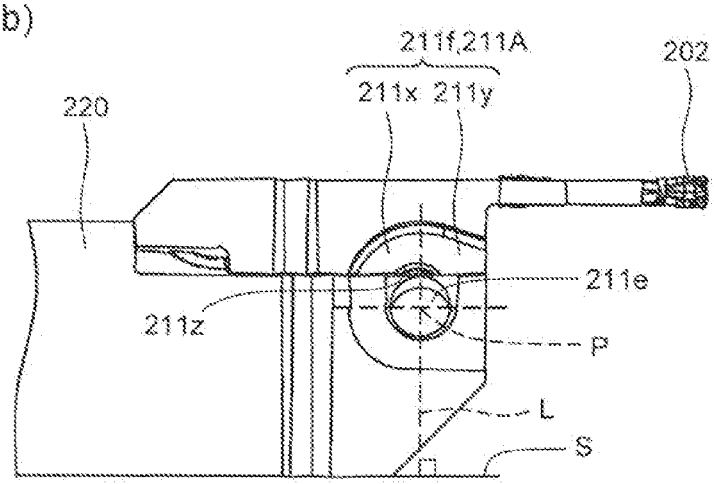

A second embodiment of the holder and the cutting tool according to the present invention is described in details below with reference to FIG. 3.

Similarly to the cutting tool 100 of the foregoing first embodiment, the cutting tool 200 of the present embodiment generally includes a holder 201 and an insert 202. The holder 201 includes a head member 210 having a first fixing section 211 and a second fixing section 212, a holder body 220, and a pressing member 230.

The first fixing section 211 is divided into a first front end region 211c and a first rear end region 211d, and has a contact part 211f pressed by a pressing part 231 of the pressing member 230 at a portion of a first surface 211a close to the first front end region 211c in reference to the first rear end region 211d.

That is, the first fixing section 211 does not include a first fixing hole 211e for inserting an inserting part 232 of the pressing member 230. The first fixing hole 211e is formed in the holder body 220. In the present embodiment, the first fixing hole 211e is inclined with respect to a vertical direction from the first fixing section 211 to the second fixing section 212. Specifically, the holder body 220 is divided into a holder front end region and a holder rear end region in the present embodiment. The first fixing hole 211e is inclined toward the holder rear end region as going downward. The contact pact 211f of the first surface 211a is a flat surface vertical to an insertion direction of the pressing member 230 in the first fixing hole 211e.

In spite of the fact that the cutting tool 200 of the present embodiment is a separate type in which the head member 210 and the holder body 220 are formed by different members because the first fixing hole 211e is inclined with respect to the vertical direction as described above, the cutting tool 200 is capable of employing a larger clamp screw (the pressing member 230) than the cutting tool 100 of the first embodiment.

The pressing member 230 includes the pressing part 231 and the inserting part 232. The pressing member 230 has the function of narrowing down a fixing space 240 between the first fixing section 211 and the second fixing section 212 of the head member 210, and the function of gripping and fixing the insert 202 positioned in the fixing space 240 (refer to FIG. 5(C)), by a force that the pressing part 231 presses against the contact part 211f of the first fixing section 211.

In the present embodiment, the inserting part 232 and the pressing part 231 of the pressing member 230 act on different members. That is, the inserting part 232 is inserted into the first fixing hole 211e of the holder body 220, and the pressing part 231 presses against the contact part 211f of the first fixing section 211.

The insert 202 includes a fixed part 202a contacted with the first fixing section 211 and the second fixing section 212 in the fixing space 240, and a cutting part 202b located outward of the first front end region 211c as compared to the fixing space 240 (refer to FIG. 3(a) and FIG. 5(c)).

The difference from the cutting tool 100 of the foregoing first embodiment is that the first fixing hole 221 is formed in the holder body 220. Accordingly, the first surface 211a of the first fixing section 211 is located at a higher position than a surface (upper surface) of the holder body 220 adjacent thereto. That is, the first fixing section 211 includes a first contact region 211A in which the pressing part 231 and the first surface 211a are overlapped with each other, and the holder body 220 includes a second contact region 220A in which the pressing part 231 and the holder body 220 are overlapped with each other, in a perspective view from the first surface 211a of the first fixing section 211. The first contact region 211A is located at a higher position than the second contact region 220A in a side view (refer to FIG. 3(a)). Thus, when gripping and fixing the insert 202, the pressing part 231 of the pressing member 230 can contact with and press against the first surface 211a of the first fixing section 211 without contacting with the surface (upper surface) of the holder body 220 adjacent thereto.

In the present embodiment, the contact part 211f includes a first contact portion 211x located close to the first rear end region 211d, and a second contact portion 211y located close to the first front end region 211c in reference to a midpoint P of the first fixing hole 211e. Additionally, an area of the second contact portion 211y is configured to be larger than an area of the first contact portion 211x. That is, as shown in FIG. 3(b), a predetermined flank part 211z is formed shiftedly toward the first rear end region 211d in reference to the midpoint P of the first fixing hole 211e in the first contact region 211A in which the first surface 211a of the first fixing section 211 and the pressing part 231 of the pressing member 230 are overlapped with each other. Thus, a contact area on the first rear end region 211d (an area of the first contact portion 211x) is decreased according to an area corresponding to the shift of the flank part 211z, as compared to a contact area on the first front end region 211c (an area of the second contact portion 211y).

In the cutting tool 200 of the present embodiment having the foregoing configuration, the force that the pressing member 230 presses against the first fixing section 211 becomes stronger on the first front end region 211c than on the first rear end region 211d in the first fixing section 211. Therefore, the pressing force of the pressing member 230 can be effectively used as a force for fixing the insert 202, thereby improving fixation reliability of the insert 202.

Also in the present embodiment, the head member 210 and the holder body 220 respectively include a serration part 203 extending from the front end region (the first front end region 211c and the second front end region 212c) to the rear end region (the first rear end region 211d and the second rear end region 212d) (refer to FIGS. 3(a), 5(a), and 5(c)).

Other configurations are similar to those of the first embodiment, and thus descriptions thereof are omitted here.

(Modification of Second Embodiment)

Figure 4:
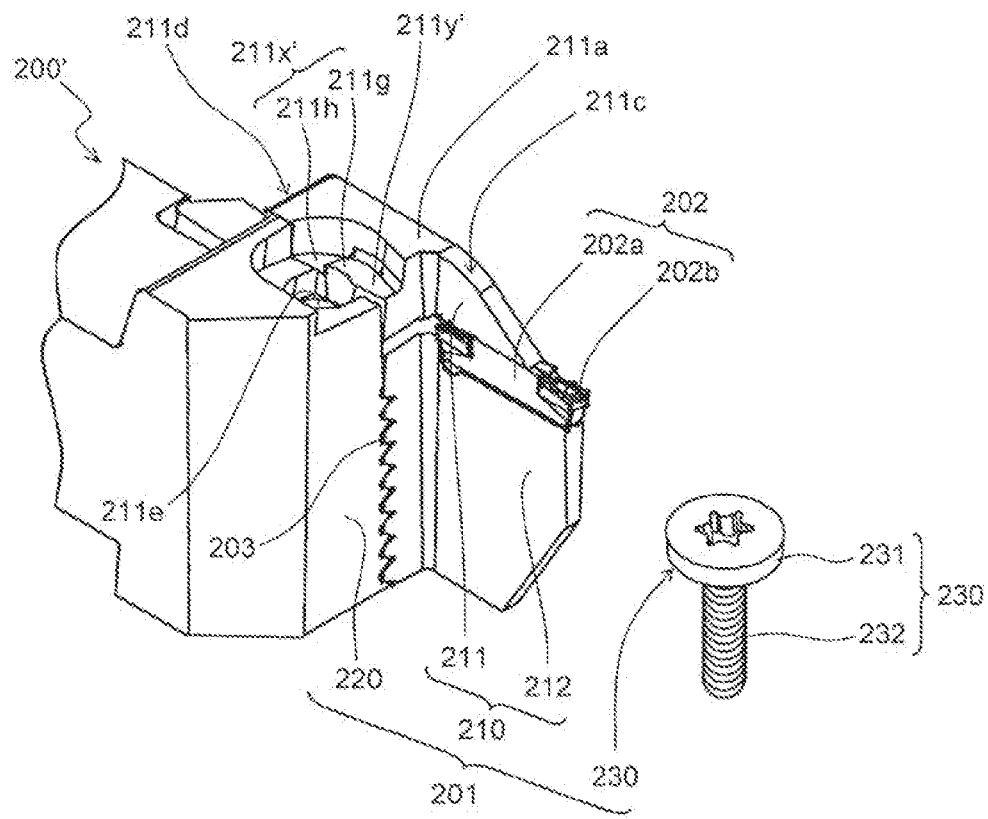
FIG. 4 is a partially enlarged view showing a modification of the cutting tool of FIG. 3: specifically.
Figure 4:
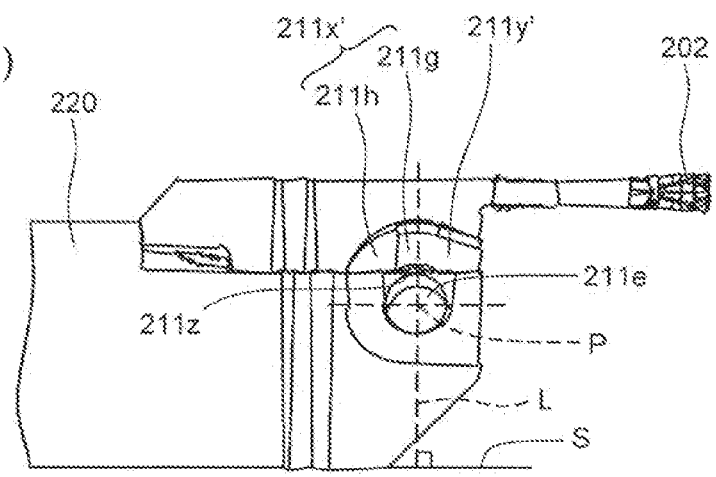
Figure 5:
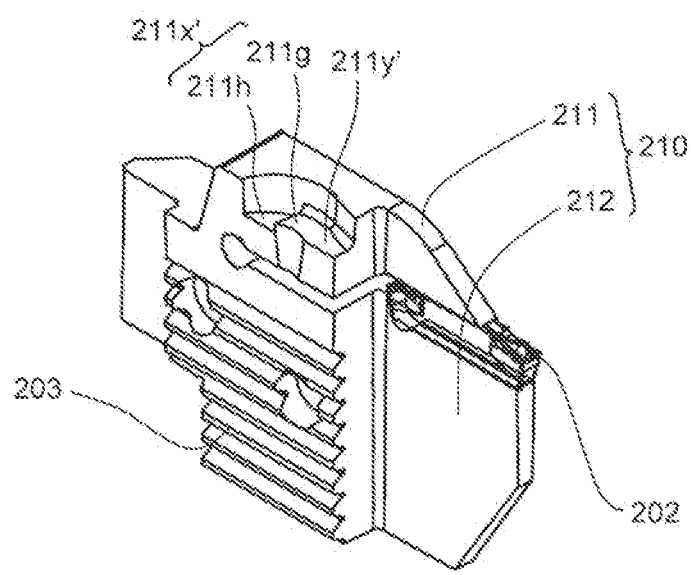
FIG. 5 is a diagram showing a head member of the cutting tool of FIG. 4: specifically.
Figure 5:
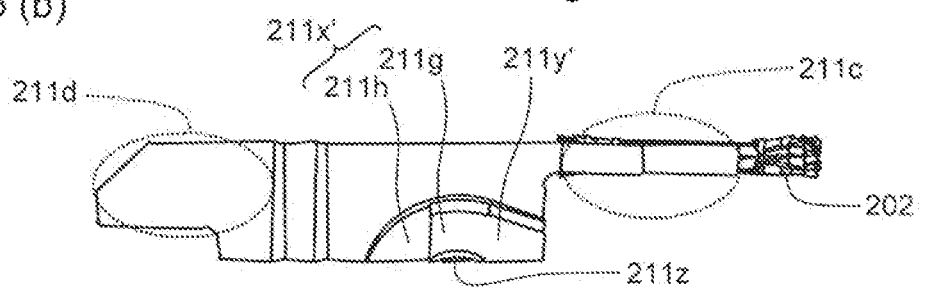
Figure 5:
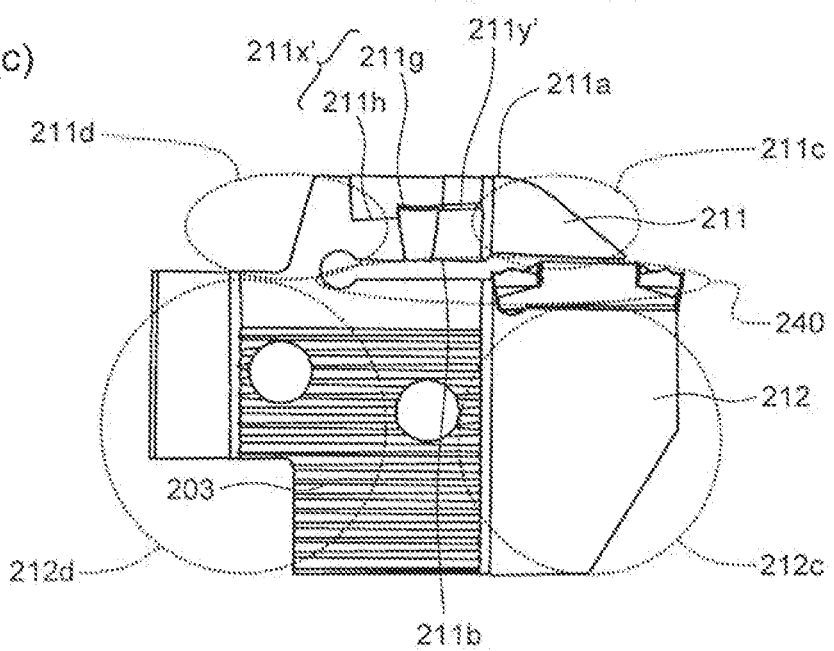

A modification of the foregoing second embodiment is described in details below with reference to FIGS. 4 and 5. In FIGS. 4 and 5, the same components as the foregoing FIG. 3 are identified by the same reference numerals, and descriptions thereof are omitted here.

In the cutting tool 200 according to the foregoing second embodiment, the first contact portion 211x and the second contact portion 211y of the contact part 211f of the first fixing section 211 exist on the same surface (flat surface). On the other hand, in a cutting tool 200' of the present embodiment shown in FIGS. 4 and 5, a first contact portion 211x' and a second contact portion 211y' are configured as follows.

That is, in the present embodiment, the second contact portion 211y' and a region 211g of the first contact portion 211x' close to the first front end region 211c exist on the same surface (flat surface), and a region 211h close to the first rear end region 211d of the first contact portion 211x' is located at a lower position than the region 211g. Further, in the cutting tool 200 of the second embodiment, the flank part 211z is formed shiftedly toward the first rear end region 211d in reference to the midpoint P of the first fixing hole 111e. On the other hand, in the present embodiment, the flank part 211z is formed at a position corresponding to the midpoint P of the first fixing hole 111e, namely, a midportion between the first front end region 211c and the first rear end region 211d.

Owing co this configuration, the pressing part 231 of the pressing member 230 can contact with and presses against the second contact portion 211y' and the region 211g close to the first front end region 211c of the first contact portion 211x' without contacting with the region 211h close to the first rear end region 211d of the first contact portion 211x'. Hence, the force that the pressing member 230 presses against the first fixing section 211 becomes stronger on the first front end region 211c than on the first rear end region 211d in the first fixing section 211. Therefore, the pressing force of the pressing member 230 can be effectively used as a force for fixing the insert 202, thereby improving fixation reliability of the insert 202.

Other configurations are similar to those of the first and second embodiments, and thus descriptions thereof are omitted here.

(Third Embodiment)

A third embodiment of the holder and the cutting tool according to the present invention is described in details below with reference to FIG. 6.

Figure 6:
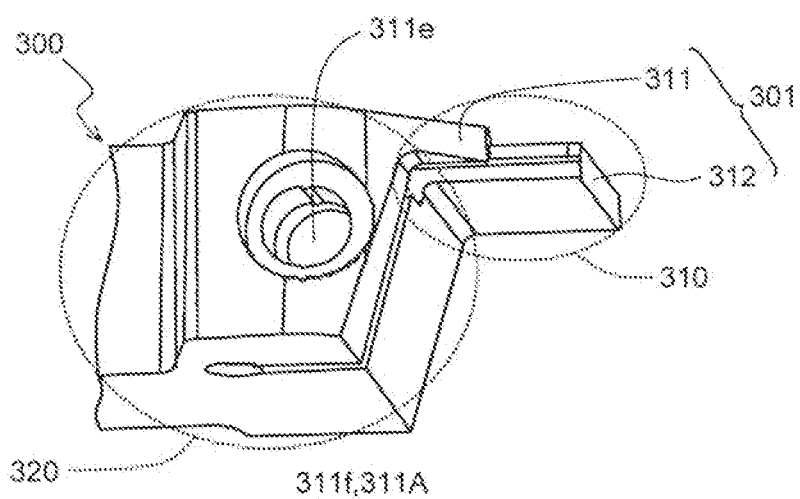
FIG. 6 is a partially enlarged view showing in enlarged dimension a front end portion of a cutting tool according to a third embodiment of the present invention: specifically.
Figure 6:
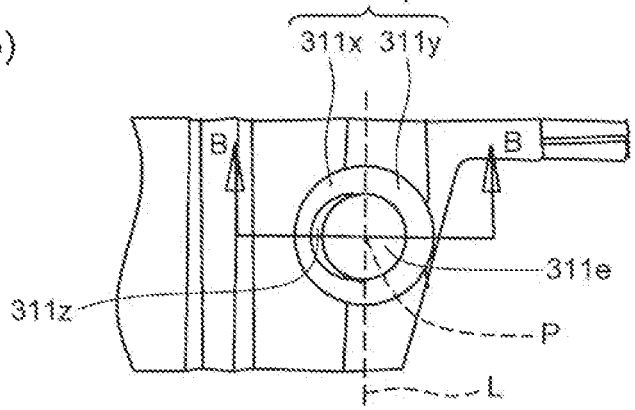
Figure 6:
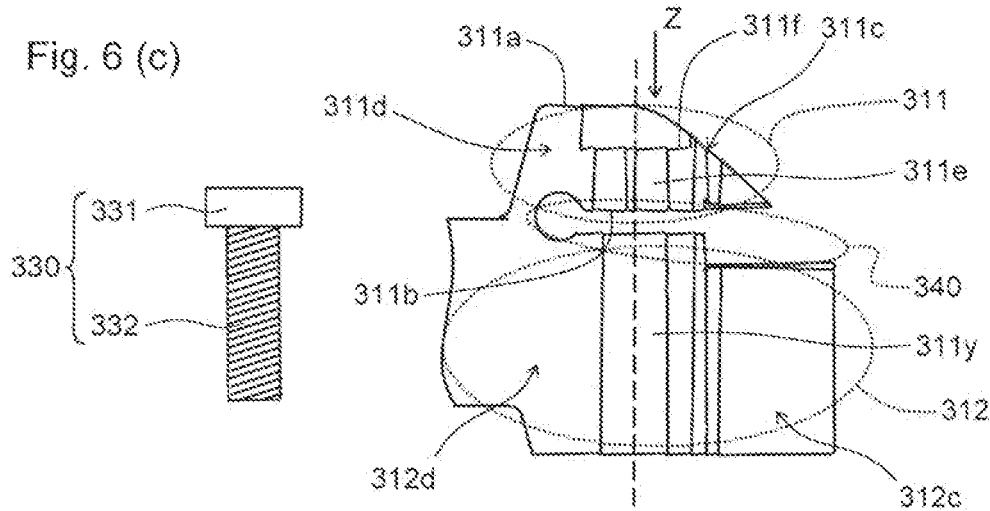

As shown in FIG. 6, a cutting tool 300 of the present embodiment generally includes a holder 301 and an unshown insert. The holder 301 includes a first fixing section 311, a second fixing section 312, and a pressing member 330. That is, the cutting tool 300 of the present embodiment has a configuration in which the head member 110 or 210 and the holder body 120 or 220 in the cutting tool 100 of the first embodiment or the cutting tool 200 of the second embodiment are integrated with each other. Individual components are described in due order below.

As shown in FIG. 6(c), in the first fixing section 311 and the second fixing section 312, a first rear end region 311d of the first fixing section 311 and a second rear end region 312d are integrated with each other so that a fixing space 340 extending from a second rear end region 312d to a second front end region 312c is located between the first and second fixing sections.

A portion for fixing the insert in the first fixing section 311 and the second fixing section 312, which are thus integrated with each other, is a head member 310, and the rest is the holder body 320. In the present embodiment, the fixing space 340 lies across the head member 310 and the holder body 320. Also in the present embodiment, the first fixing hole 311e extends in a vertical direction from the first fixing section 311 to the second fixing section 312 of the cutting tool 300. A second fixing hole 312y is continuous with the first fixing hole 311e with the fixing space 340 interposed therebetween. A contact part 311f of a first surface 311a is a flat surface perpendicular to an insertion direction of a pressing member 330 in the first fixing hole 311e.

In the head part 310, the insert is fixedly held between the first fixing section 311 and the second fixing section 312. Preferably, the head member 310 has a shape that allows the head member 310 to follow the insert and enter the inside of a groove of a workpiece when grooving of the workpiece is carried out by the cutting tool 300.

The pressing member 330 includes a pressing part 331 and an inserting part 332, as shown in FIG. 6(c). The pressing member 330 is inserted into the first fixing hole 311e of the first fixing section 311 in a direction of arrow Z, and functions to narrow down a fixing space 340 between the first fixing section 311 and the second fixing section 312 of the head member 310, and then functions to grip and fix the insert positioned in the fixing space 340, by a force that the pressing part 331 presses against the contact part 311f of the first fixing section 311.

In the present embodiment, the contact part 311f includes a first contact portion 311x located close to the first rear end region 311d, and a second contact portion 311y located close to the first front end region 311c in reference to the midpoint P of the first fixing hole 311e. Additionally, an area of the second contact portion 311y is configured to be larger than an area of the first contact portion 311x. That is, as shown in FIG. 6(b), the first fixing section 311 has a flank part 311z in a first contact region 311A in which the pressing part 331 and the first surface 311a are overlapped with each other, specifically at a portion of the first contact region 311A closer to the first rear end region 311d than the midpoint P of the first fixing hole 311e, in a perspective view from the first surface 311a of the first fixing section 311. Thus, a contact area on the first rear end region 311d (an area of the first contact portion 311x) is decreased according to an area corresponding to the flank part 311z, as compared to a contact area on the first front end region 311c (an area of the second contact portion 311y).

In the cutting tool 300 of the present embodiment having the foregoing configurations, a force that the pressing member 330 presses against the first fixing section 311 becomes stronger on the first front end region 311c than on the first rear end region 311d in the first fixing section 311. Therefore, the pressing force of the pressing member 330 can be effectively used as a force for fixing the insert, thereby improving fixation reliability of the insert.

Other configurations are similar to those of the first and second embodiments, and thus descriptions thereof are omitted here.

(Fourth Embodiment)

A fourth embodiment of the holder and the cutting tool according to the present invention is described in details below with reference to FIGS. 7 to 12.

Figure 7:
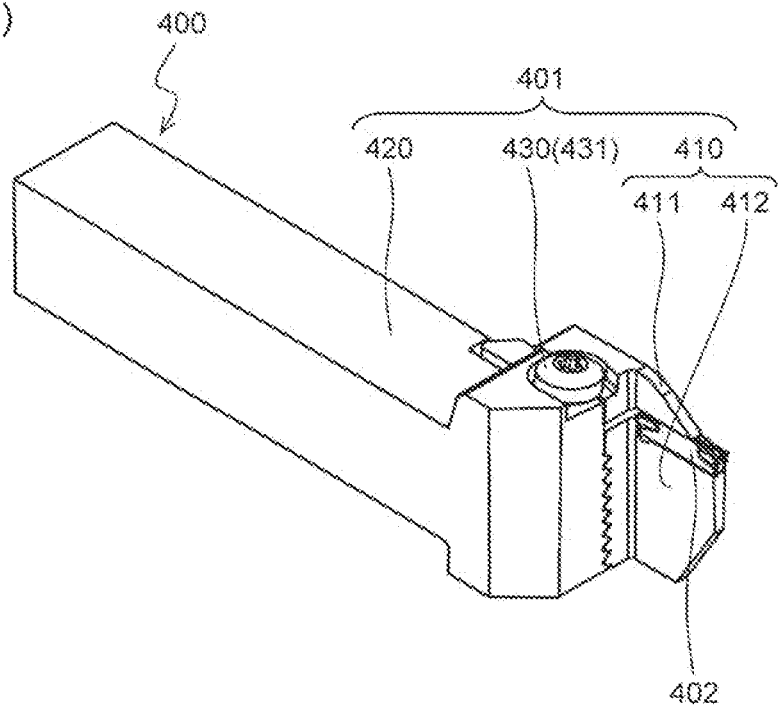
FIGS. 7(a) and 7(b) are perspective views showing a cutting tool according to a fourth embodiment of the present invention.
Figure 7:
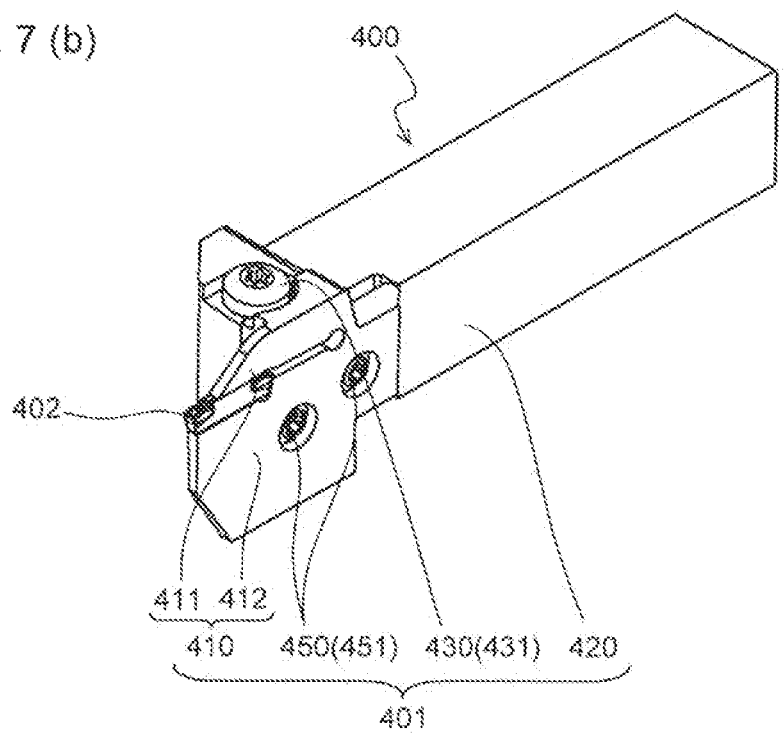
Figure 8:
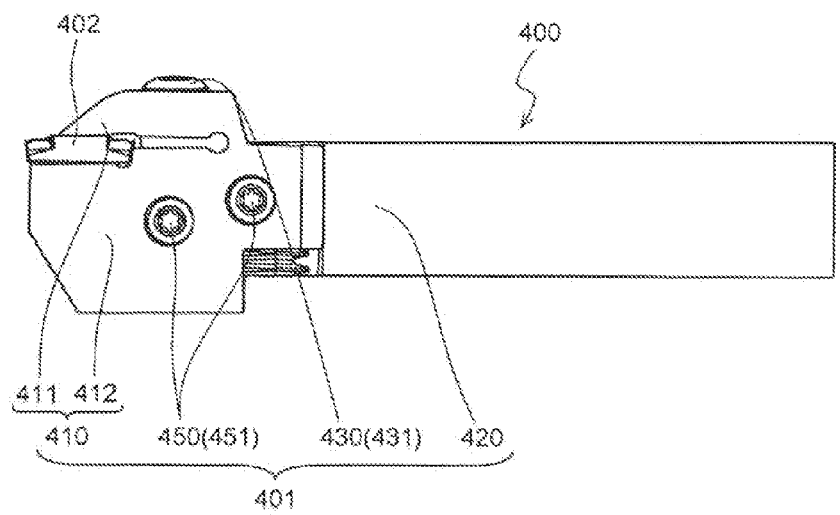
FIG. 8 is a diagram showing the cutting tool of FIG. 7: specifically.
Figure 8:
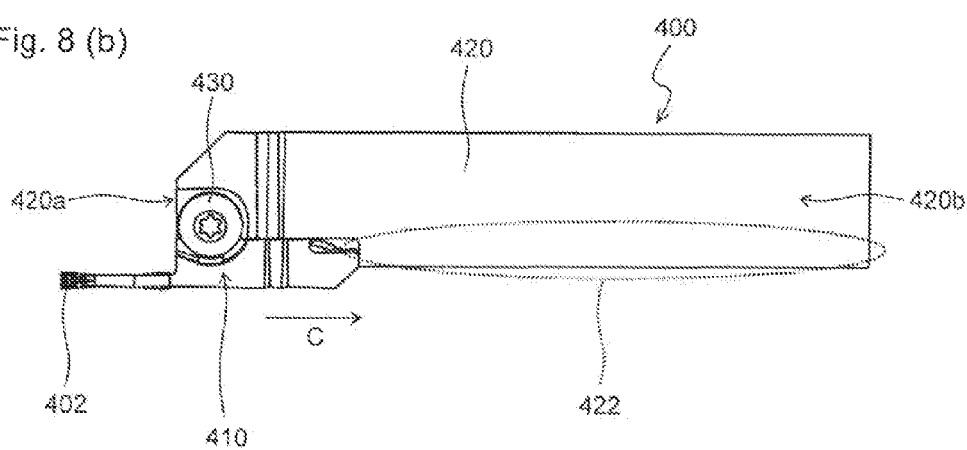

As shown in FIGS. 7 and 8, the cutting tool 400 of the present embodiment generally includes a holder 401 and an insert 402. The holder 401 includes a head member having a first fixing section 411 and a second fixing section 412, a holder body 420, and a pressing member 430, and further includes a fixing member 450. Details of individual components are described in due order below.

In the first fixing section 411 and the second fixing section 412, each constituting the head member 410, the first fixing section 411 is divided into a first front end region 411c and a first rear end region 411d in a side view from a first side surface 417, as shown in FIG. 11(c). The first fixing section 411 has a contact part 411f pressed by a pressing part 431 of the pressing member 430, at a portion of a first surface 411a close to the first front end region 411c in reference to the first rear end region 411d. The contact part 411f is a flat surface perpendicular to an insertion direction of the pressing member 430 in a first fixing hole 411e (refer to FIG. 9).

As shown in FIG. 11(c), the second fixing section 412 is divided into a second front end region 412c and a second rear end region 412d, and the first rear end region 411d of the first fixing section 411 and the second rear end region 412d are integrated with each other so that a fixing space 440 extending from the second rear end region 412d to the second front end region 412c is located between the second fixing section and the second surface 411b of the first fixing section 411. In the present embodiment, the first front end region 411c and the second front end region 412c are collectedly referred to as "head front end region 410a," and the first rear end region 411d and the second rear end region 412d are collectedly referred to as "head rear end region 410b" in some cases.

Figure 11:
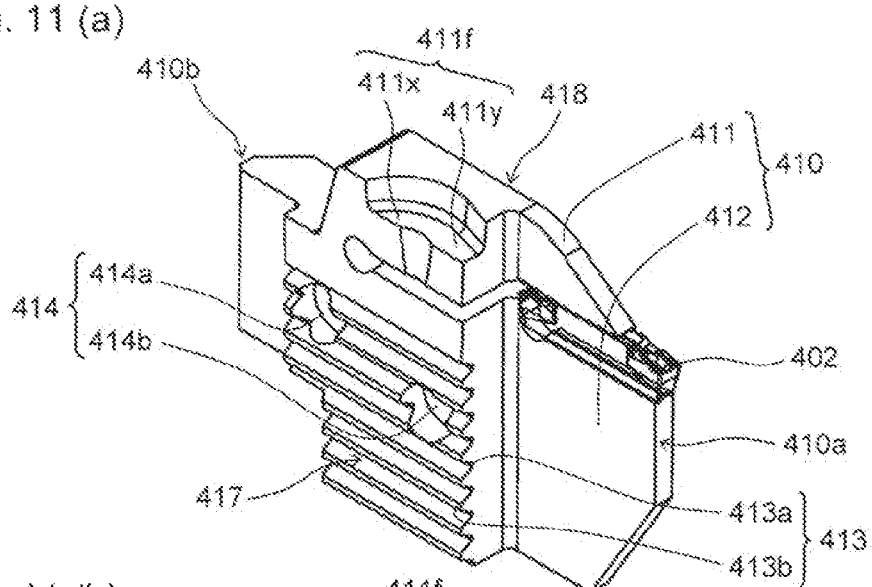
FIG. 11 is a diagram showing a head member of the cutting tool shown in FIG. 7: specifically.
Figure 11:
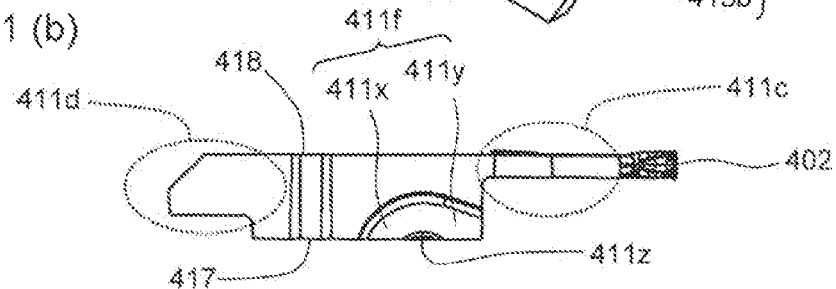
Figure 11:
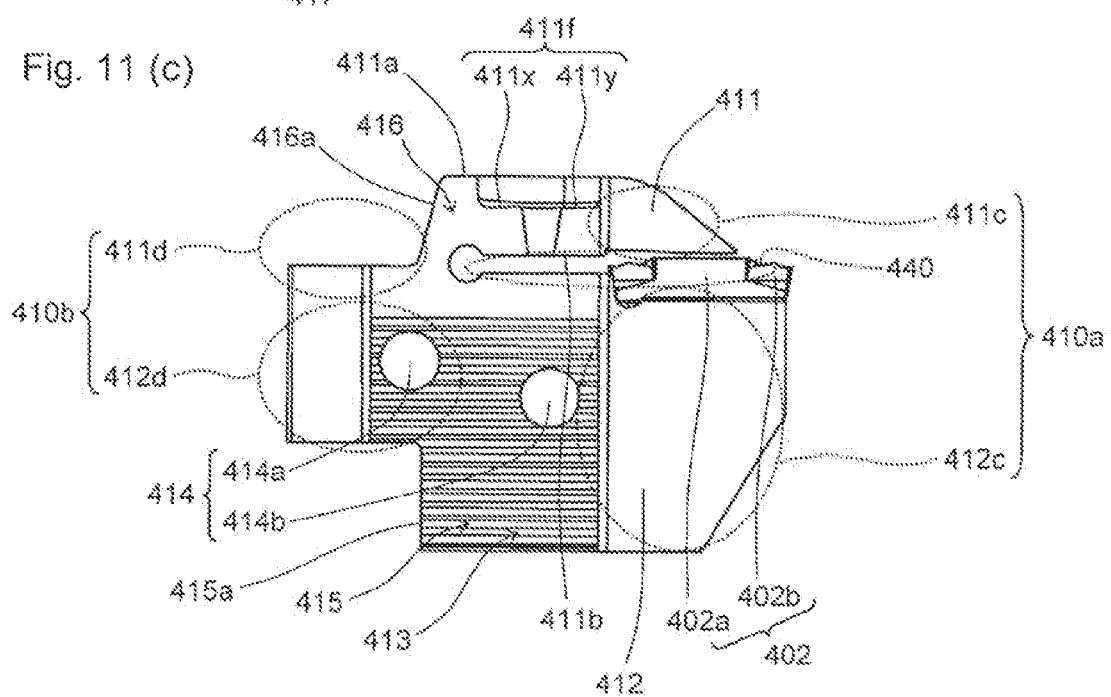

As shown in FIG. 11, the head member 410 having the first fixing section 411 and the second fixing section 412 includes a second serration part 413 which is located on a first side surface 417 and is engaged with a first serration part 423 described later, and two through holes 414 (a first through hole 414a and a second through hole 414b) extending from the first side surface 417 to a second side surface 418 located opposite the first side surface 417. As shown in FIG. 9(b), the head rear end region 410b is contacted with an end portion 422a of the holder front end region of a wide part 422 of the holder body 420 described later.

The two through holes 414 are preferably located at the second serration part 413 on the first side surface 417 (refer to FIG. 11). The second serration part 413 has a configuration in which grooves 413a and lands 413b are alternately formed. In the present, embodiment, the grooves 413a extend from the head front end region 410a to the head rear end region 410b. The grooves 413a preferably extend in a perpendicular direction with respect to the head rear end region 410b contacted with the end portion 422a of the holder front end region of the holder body 420 in a side view.

Figure 12:
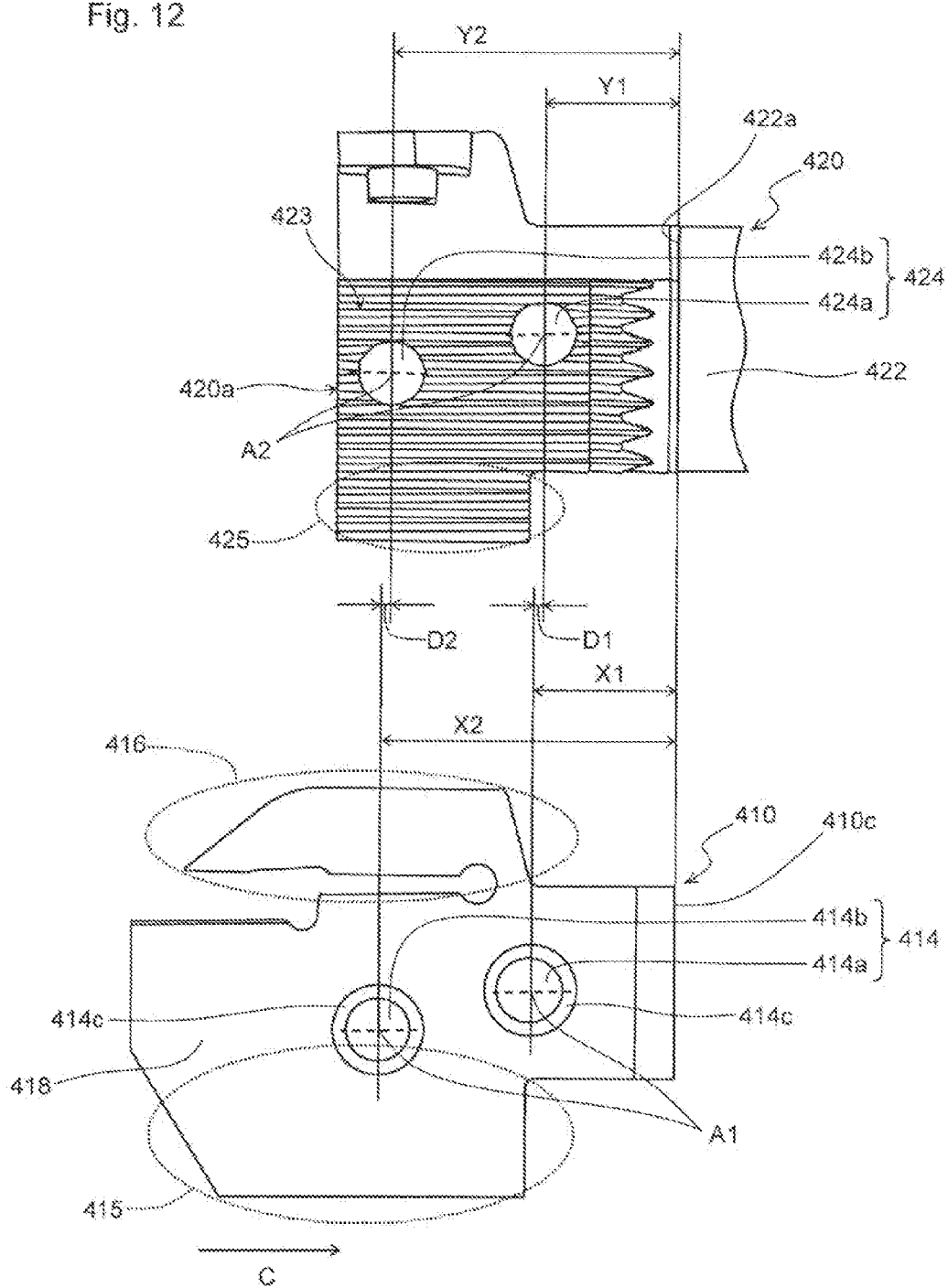
FIG. 12 is a partially exploded view showing the front end portion by exploding the cutting tool shown in FIG. 7.

In the head member 410, at least a portion of the second serration part 413 preferably has a second lower protrusion 415 protruding downward with respect to the head rear end region 410b of the head member 410 in a side view (refer to FIGS. 11(c) and 12). The head member 410 preferably has, at the head front end region 410a, an upper protrusion 416 protruding upward with respect to the head rear end region 410b in a side view. A rear end 415a of the second lower protrusion 415 is preferably located closer to the head rear end region 410b of the head member 410 than a rear end 416a of the upper protrusion 416 in the side view.

Figure 10:
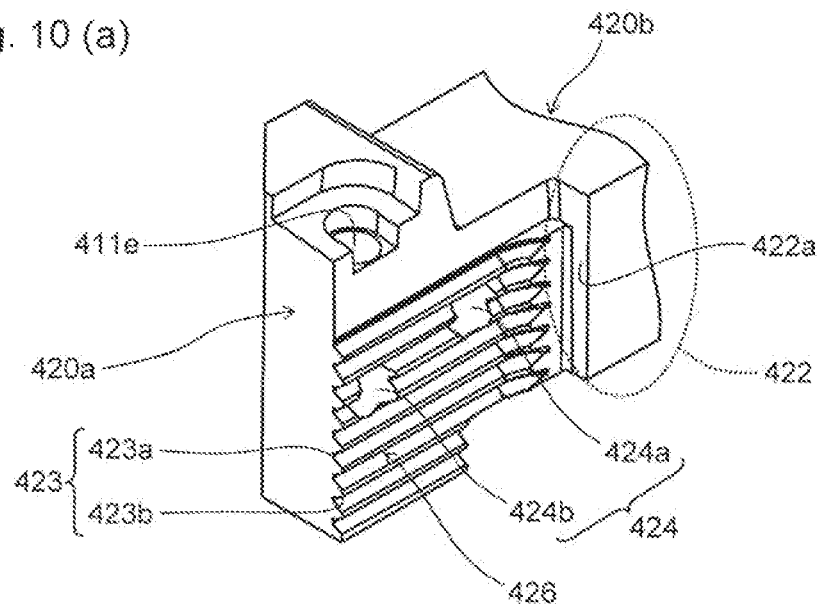
FIG. 10 is a partially enlarged view showing in enlarged dimension a front end portion of a holder body of the cutting tool shown in FIG. 7: specifically.
Figure 10:
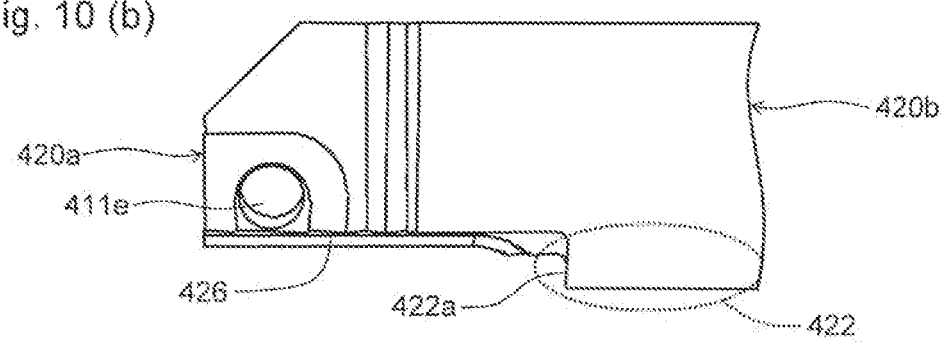
Figure 10:
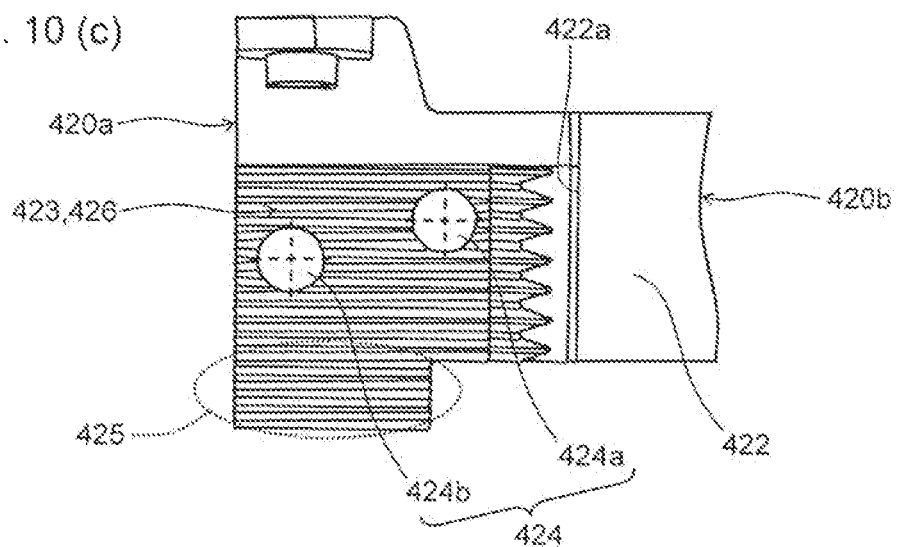

As shown in FIGS. 8(b) and 10, the holder body 420 is divided into a holder front end region 420a, and a holder rear end region 420b having a wide part 422 protruding in a width direction with respect to a holder front end region 420a in a top view. The holder body 420 has a first serration part 423 and two hole portions 424 (first hole portion 424a and second hole portion 424b) on a side surface 426 close to the wide part 422 in the holder front end region 420a. In the present specification, the phrase "side surface 426" denotes a side surface opposed to the first side surface 417 of the head member 410 in the holder front end region 420a.

The two hole portions 424 are preferably located at the first serration part 423 on the side surface 426. The first serration part 423 has a configuration in which grooves 423a and lands 423b are alternately formed. In the present embodiment, the grooves 423a extend from the holder front end region 420a to the holder rear end region 420b. The holder body 420 and the head member 410 are fixed to each other with a fixing member 450 in a state in which the first serration part 423 located on the side surface 426 of the holder body 420 and the second serration part 413 located on the first side surface 417 of the head member 410 are engaged with each other. In the holder body 420, at least a portion of the first serration part 423 preferably has a first lower protrusion 425 protruding downward with respect to the holder rear end region 420b of the holder body 420 in a side view.

In the present embodiment, as shown in FIG. 12, a central axis A1 of the through holes 414 of the head member 410 is eccentric toward the holder front end region 420a with respect to a central axis A2 of the hole portions 420 of the holder body 420. In the present specification, the sentence "the central axis is eccentric" denotes that the central axis is shifted in a side view. Specifically, in the present embodiment, the central axis A1 of the first through hole 414a and the central axis A2 of the first hole portion 424a are eccentric to each other, and the central axis A1 of the second through hole 414b and the central axis A2 of the second hole portion 424b are eccentric to each other.

That is, as shown in FIG. 12, X1, X2, Y1, and Y2 have relationships of X1−Y1=D1 (D1>0) and X2−Y2=D2 (D2>0), where X1 is a distance between a rear end 410c of the head member 410 and the central axis A1 of the first through hole 414a, X2 is a distance between the rear end 410c and the central axis A1 of the second through hole 414b, Y1 is a distance between an end portion 422a of the holder front end region of the wide part of the holder body 420 and the central axis A2 of the first hole portion 424a, and Y2 is a distance between the end portion 422a and the central axis A2 of the second hole portion 424b.

It is preferable that directions of their respective eccentricities are parallel to each other. It is also preferable that the directions of their respective eccentricities and a longitudinal direction of the groove 423a of the first serration part 423 are parallel to each other in a side view.

The fixing member 450 has the function of fixing the holder body 420 and the head member 410, and is a screw including a head (pressing part) 451 and an unshown shank (inserting part) in the present embodiment (refer to FIGS. 7(b) and 8(a)). In the present embodiment, the inserting part of the fixing member 450 extends from the inside of the hole portions 424 to the inside of the through holes 414, and the pressing part 451 of the fixing member 450 presses against a pressed surface 414c on a second side surface 418 of the head member 410 shown in FIG. 12.

According to the holder 401 of the foregoing present embodiment, the central axis A1 of the through holes 414 is eccentric toward the holder front end region 420a of the holder body 420 with respect to the central axis A2 of the hole portions 424. Therefore, when the holder body 420 and the head member 410 are fixed together by the fixing member 450, the head member 410 receives a force in a direction of arrow C which is applied to the head rear end region 410b relative to the holder body 420 (refer to FIGS. 8(b), 9(b), and 12). As a result, the head rear end region 410b of the head member 410 is strongly contacted with the end portion 422a of the holder front end region of the wide part 422 of the holder body 420, thereby improving fixation strength between the two. It is therefore capable of reducing chatter vibration between the head member 410 and the holder body 420 due to the thrust force caused during the cutting processing. This achieves an improvement of machining accuracy with respect to the workpiece.

The foregoing effect is described in further details. The central axis A1 of the through holes 414 is eccentric toward the holder front end region 420a of the holder body 420 with respect to the central axis A2 of the hole portions 424. Therefore, when the fixing member 450 lies from the inside of the hole portions 424 to the inside of the through holes 414, the fixing member 450 presses against a portion close to the holder front end region 420a of an inner walls of the hole portions 424 of the holder body 420, and at the same time, presses against a portion close to the head rear end region 410b on the inner walls of the through holes 414 of the head member 410. Consequently, the head rear end region 410b of the head member 410 is strongly contacted with the end portion 422a of the holder front end region of the wide part 422 of the holder body 420, thereby improving the fixation strength between the two.

According to the present embodiment, the following effects can be produced.

That is, the central axis A1 of the first through hole 414a and the central axis A2 of the first hole portion 424a are eccentric to each other, and the central axis A1 of the second through hole 414b and the central axis A2 of the second hole portion 424b are eccentric to each other, and directions of their respective eccentricities are parallel to each other. Accordingly, contact forces of the holder body 420 and the head member 410 on the basis of two eccentricities are collected together, thus permitting a further improvement of the fixation strength between the two.

Further, the directions of the eccentricities and the longitudinal direction of the groove 423a constituting the first serration part 423 are parallel to each other in a side view. Hence, a force generated due to the eccentricities can be effectively operated as a contact force of the holder body 420 and the head member 410 with the first serration part 423 interposed therebetween.

The groove 413a constituting the second serration part 413 extends in the perpendicular direction with respect to the head rear end region 410b of the head member 410 in the side view. Therefore, the force generated due to the eccentricities can be effectively received by the head rear end region 410b of the head member 410 with the second serration part 413 interposed therebetween, and can be effectively operated as the contact force of the holder body 420 and the head member 410.

In the holder body 420, at least the portion of the first serration part 423 has the first lower protrusion 425 protruding downward with respect to the holder rear end region 420b of the holder body 420 in the side view. Also in the head member 410, at least the portion of the second serration part 413 has the second lower protrusion 415 protruding downward with respect to the head rear end region 410b of the head member 410 in the side view. Therefore, the fixation strength between the holder body 420 and the head member 410 through engagement can be improved by increasing an engagement area between the first serration part 423 and the second serration part 413. Particularly, an excellent effect can be produced under cutting conditions in which cutting speed is high, and a principal cutting force applied from top to bottom is large.

The head member 410 has, on the heat front end region 410a, the upper protrusion 416 protruding upward with respect to the head rear end region 410b in the side view, and the rear end 415a of the second lower protrusion 415 is located closer to the head rear end region 410b of the head member 410 than the rear end 416a of the upper protrusion 416 in the side view. Therefore, deflection of the holder 401 can be reduced by the upper and lower protrusions (second lower protrusion 415 and upper protrusion 416), while ensuring holding strength by holding the insert 402 at a position closer to the front end region as much as possible.

The two hole portions 424 are both located at the first serration part 423 of the side surface 426, and the two through holes 414 are both located at the second serration part 413 of the first side surface 417. Therefore, the force generated due to the eccentricities can be directly transmitted by the first serration part 423 and the second serration part 413, and can be effectively operated as the contact force of the holder body 420 and the head member 410.

On the other hand, in the present embodiment, configurations other than those described above are similar to those in the first to third embodiments. That is, the pressing member 430 includes a pressing part 431 and an unshown inserting part. In the present embodiment, the inserting part and the pressing part 431 of the pressing member 430 act on different members. Specifically, the inserting part is inserted into the first fixing hole 411*e* of the holder body 420, and the pressing part 431 presses against the contact part 411*f* of the first fixing section 411.

As shown in FIG. 11(*c*), the insert 402 includes a fixed part 402*a* contacted with the first fixing section 411 and the second fixing section 412 in the fixing space 440, and a cutting part 402*b* located outward of the first front end region 411*c* as compared to the fixing space 440.

Figure 9:
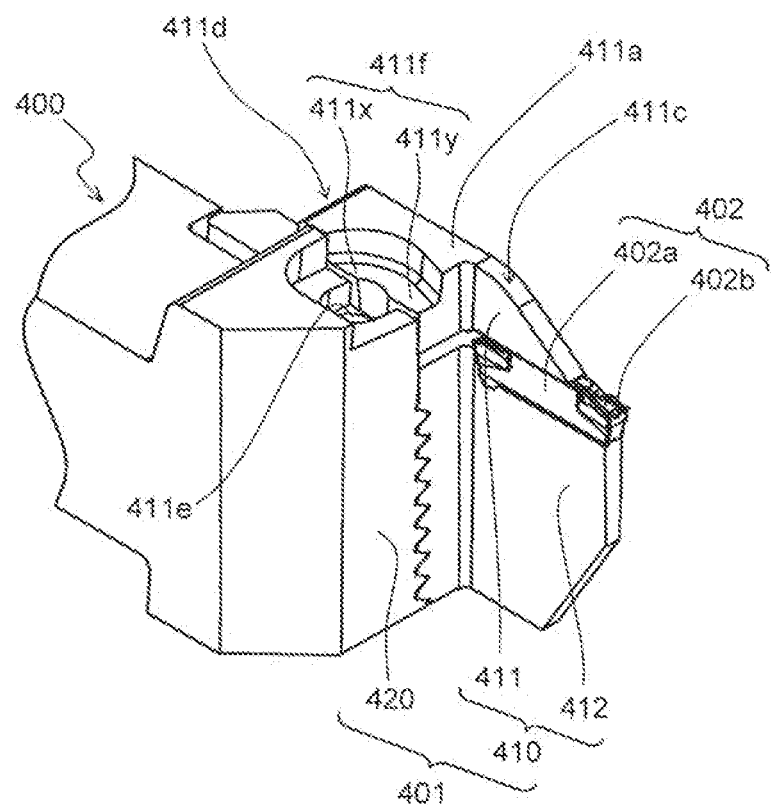
FIG. 9 is a partially enlarged view showing in enlarged dimension a front end portion of the cutting tool shown in FIG. 7: specifically.
Figure 9:
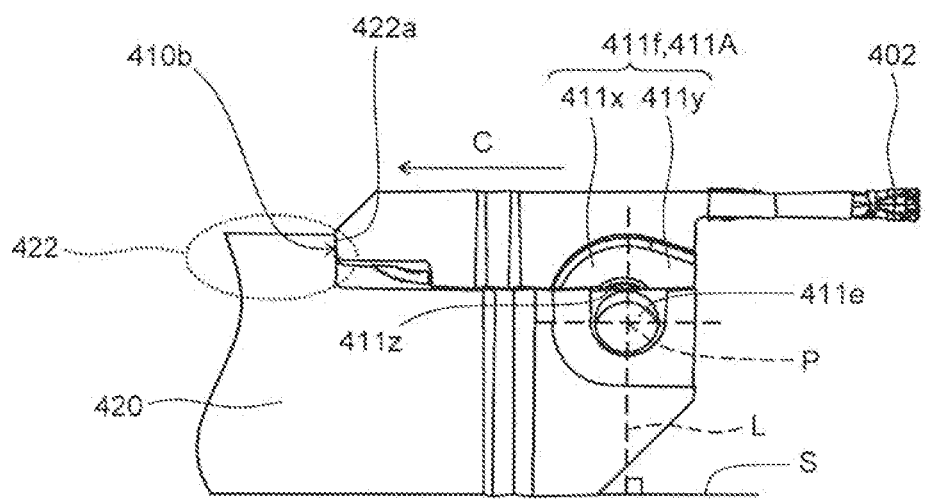

In the present embodiment, the fixing hole 411*e* is formed in the holder body 420 as shown in FIG. 9. Accordingly, the first surface 411*a* of the first fixing section 411 of the head member 410 is located at a higher position than a surface (upper surface) of the holder body 420 adjacent thereto. This produces a similar effect to the foregoing second embodiment.

In the present embodiment, the contact part 411*f* includes a first contact portion 411*x* located close to the first rear end region 411*d*, and a second contact portion 411*y* located close to the first front end region 411*c* in reference to the midpoint P of the first fixing hole 411*e*. Additionally, an area of the second contact portion 411*y* is configured to be larger than an area of the first contact portion 411*x*. That is, as shown in FIG. 9(*b*), a predetermined flank part 411*z* is formed shiftedly toward the first rear end region 411*d* in reference to the midpoint P of the first fixing hole 411*e* in a contact region 411A in which the first surface 411*a* of the first fixing section 411 and the pressing part 431 of the pressing member 430 are overlapped with each other. Thus, a contact area on the first rear end region 411*d* (an area of the first contact portion 411*x*) is decreased according to an area corresponding to the shift of the flank part 411*z*, as compared to a contact area on the first front end region 411*c* (an area of the second contact portion 411*y*). This produces a similar effect to that in each of the foregoing embodiments.

In the present embodiment, the first fixing hole 411*e* is inclined with respect to a vertical direction from the first fixing section 411 to the second fixing section 412. Specifically, the first fixing hole 411*e* is inclined toward the holder rear end region 420*b* as going downward. In spite of a separate type in which the head member 410 and the holder body 420 are formed by different members, it is capable of employing a relatively large clamp screw (the pressing member 430) similarly to the foregoing second embodiment.

Other configurations are similar to those of the first to third embodiments, and thus descriptions thereof are omitted here.

(Fifth Embodiment)

A fifth embodiment of the holder and the cutting tool according to the present invention is described in details below. Basic configurations of the present embodiment are similar to those of the foregoing fourth embodiment, and the present embodiment has the configurations shown in FIGS. 7 to 12, except for the following contents described below.

Similarly to the foregoing fourth embodiment, the holder of the present embodiment includes the holder body 420, the head member 410, the pressing member 430, and the fixing member 450.

In the present embodiment, the head member 410 has the pressed surface 414*c* pressed by the fixing member 450, and the pressed surface 414*c* is inclined toward the head rear end region 410*b* from the first side surface 417 to the second side surface 418. Hence, similarly to the foregoing fourth embodiment, when the holder body 420 and the head member 410 are fixed together by the fixing member 450, the head member 410 receives a force applied to the head rear end region 410*b* relative to the holder body 420. As a result, the head rear end region 410*b* of the head member 410 is strongly contacted with the end portion 422*a* of the holder front end region of the wide part 422 of the holder body 420, thereby improving fixation strength between the two. It is therefore capable of reducing chatter vibration between the head member 410 and the holder body 420 due to the thrust force caused during the cutting processing. This achieves an improvement of machining accuracy with respect to a workpiece.

This effect is described in further details below. Also in the present embodiment, the fixing member 450 is a screw including the head (pressing part) 451 and the unshown shank (inserting part). As described above, the pressed surface 414*c* is inclined toward the head rear end region 410*b* from the first side surface 417 to the second side surface 418 of the head member 410. Therefore, a force that the pressing part 451 of the fixing member 450 presses against the pressed surface 414*c* is operated as a force that the head member 410 moves to the head rear end region 410*b* relative to the holder body 420. Consequently, the head rear end region 410*b* of the head member 410 is strongly contacted with the end portion 422*a* of the wide part 422 of the holder body 420, thereby improving fixation strength between the two.

In the present embodiment, the central axis A1 of the through holes 414 and the central axis A2 of the hole portions 424 may be configured to be coaxial with each other. The present embodiment having the foregoing configurations is capable of producing the foregoing effect by controlling the configuration of the pressed surface 414*c* without allowing the central axes A1 and A2 to be eccentric to each other.

In the present embodiment, the hole portions 424 of the holder body 420 may be inclined toward the holder rear end region 420*b* from the second side surface 418 to the first side surface 417. The through holes 414 of the head member 410 may be inclined toward head rear end region 410*b* from the side surface 426 to inward. Also in this case, the fixation strength of the holder body 420 and the head member 110 can be improved.

Other configurations are similar to those of the first to third embodiments, and thus descriptions thereof are omitted here.

<Method of Manufacturing Machined Product>

A method of manufacturing a machined product according to an embodiment of the present invention is described in detail below with reference to FIG. 13, by exemplifying a case of using the cutting tool 300 according to the foregoing third embodiment.

Figure 13:
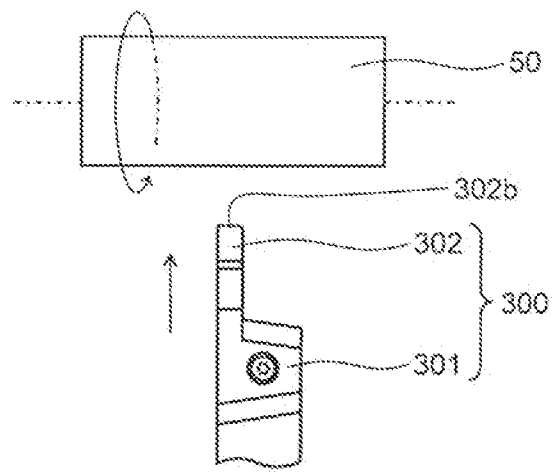
FIGS. 13(a) to 13(c) are schematic explanatory drawings showing a method of manufacturing a machined product according to an embodiment of the present invention.
Figure 13:
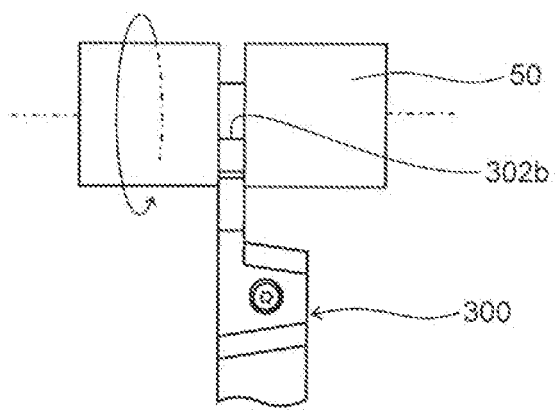
Figure 13:
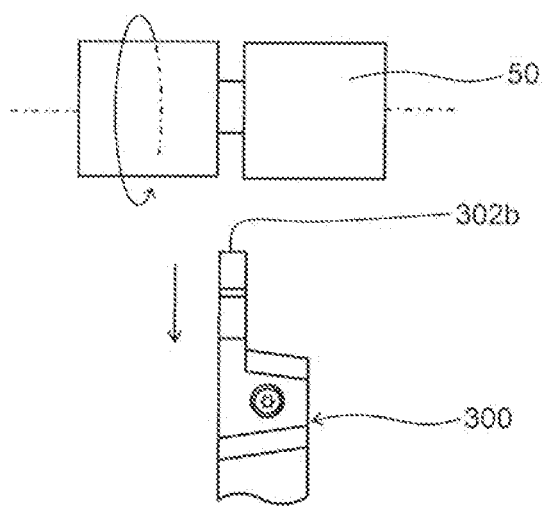

Firstly, as shown in FIG. 13(*a*), the insert 302 is attached to the holder 301. In the attached insert 302, the fixed part is contacted with the first fixing section 311 and the second fixing section 312 in the fixing space 340, and the cutting part 302*b* is located outward of the first front end region 311*c* as compared to the fixing space 340.

Then, as shown in FIG. 13(*a*), the cutting part 302*b* of the cutting tool 300 is brought near a workpiece 50 by rotating the workpiece 50. The cutting part 302*b* and the workpiece 50 need to be brought near each other. For example, the workpiece 50 may be brought near the cutting tool 300.

Subsequently, as shown in FIG. 13(*b*), the workpiece 50 is cut by bringing the cutting pate 302*b* into contact with the workpiece 50.

Thereafter, as shown in FIG. 13(*c*), the cutting tool 300 is separated from the workpiece 50. When the cutting processing is continued, the step of bringing the cutting part 302 of the cutting tool 300 into contact with different portions of the workpiece 50 is repeated while holding the rotation of the workpiece 50.

A desired machined product can be obtained by cutting the workpiece 50 in the foregoing manner. Further, the present embodiment allows the insert 302 to be stably fixed to the holder 301, thus permitting the stable cutting processing of the workpiece 50 over a long period of time.

A similar effect is obtainable by using the cutting tool according to any one of the foregoing embodiments instead of the cutting tool 300 according to the third embodiment. Particularly, when the cutting tool of the fourth or fifth embodiment is used, the fixation strength of the head member 410 and the holder body 420 is high, and it is therefore capable of reducing the chatter vibration between the head member 410 and the holder body 420 due to the thrust force caused during the cutting processing. This achieves an improvement of machining accuracy.

While the several embodiments according to the present invention have been described and illustrated above, it is to be understood that the present invention is not limited to the foregoing embodiments, and various improvements and changes can be made within the scope of the appended claims.

For example, the configurations in the foregoing embodiments may be mutually changed or combined together. As an example thereof, the serration structure in the cutting tool of the first embodiment may be changed to the serration structure in the fourth embodiment. This is similarly true for other changes or combinations.

Although the foregoing embodiments have been described by exemplifying the cutting tool for grooving, they may be applied to cutting tools for other cutting processing, such as copying, face grooving, traversing process, inner-diameter process, and cutoff process, insofar as they do not depart from the objects of the present invention.

Figure 14:
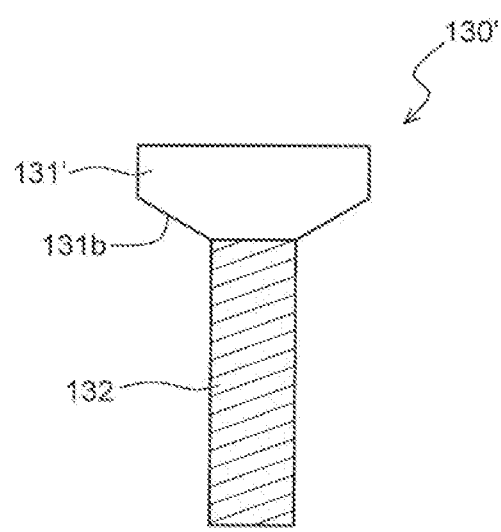
FIG. 14 is a side view showing a modification of the pressing member according to the present invention.

Although in the first embodiment, the surface 131a (contact surface) close to the lower part of the pressing part 131 (inserting part 132) of the pressing member 130 is the flat surface perpendicular to the central axis of the inserting part 132, the surface 131a may be an inclined surface. Specifically, in the pressing member 130' shown in FIG. 14, the surface 131b (contact surface) close to the lower part of the pressing part 131' (the inserting part 132) is inclined at a predetermined inclination angle with respect to the central axis of the inserting part 132. By adjusting an inclination angle of the surface 131b, an area of the contact part 111f of the first fixing section 111 can be controlled, thereby improving fixation reliability of the insert 102.

Although in the second embodiment, the first fixing hole 211e is inclined toward the holder rear end region with respect to the vertical direction from the first fixing section 211 to the second fixing section 212 of the cutting tool 200 as going downward, the first fixing hole 211e may be inclined toward the holder body 220 as going downward. By adjusting the inclination, an area of the contact part 211f of the first fixing section 211 can be controlled, thereby improving fixation reliability of the insert 202.

The invention claimed is:

1. A cutting tool holder, comprising:
a pressing member comprising a pressing part and an inserting part;
a holder body; and
a head member comprising
a first fixing section which is divided into a first front end region and a first rear end region, and comprises a first fixing hole configured to insert the inserting part of the pressing member and a contact part pressed by the pressing part of the pressing member, at a portion of a first surface close to the first front end region in reference to the first rear end region, and
a second fixing section divided into a second front end region and a second rear end region, wherein the first rear end region of the first fixing section and the second rear end region are connected to each other and a fixing space extending from the second rear end region to the second front end region is located between the second fixing section and a second surface different from the first surface in the first fixing section,
wherein
the contact part comprises a first contact portion located close to the first rear end region and a second contact portion located close to the first front end region in reference to a midpoint of the first fixing hole, and
an area of the second contact portion is larger than an area of the first contact portion,
the holder body is divided into a holder front end region and a holder rear end region comprising a wide part protruding in a width direction with respect to the holder front end region in a top view, and the holder body comprises a first serration part and at least one hole portion on a side surface closer to the wide part in the holder front end region,
the head member further comprises a second serration part which is located on a first side surface and is engaged with the first serration part, and at least one through hole extending from the first side surface to a second side surface located opposite the first side surface, in which a head rear end region is contacted with an end portion of the wide part closer to the holder front end region,
the cutting tool holder further comprises a fixing member lying from inside of the at least one hole portion to inside of the at least one through hole, and
a central axis of the at least one through hole is eccentric to the holder front end region of the holder body with respect to a central axis of the at least one hole portion.

2. A cutting tool, comprising:
the cutting tool holder according to claim 1; and
an insert comprising a fixed part contacted with the first fixing section and the second fixing section in the fixing space, and a cutting part located outward of the first front end region as compared to the fixing space.

3. The cutting tool according to claim 2, wherein a width of the first front end region in the first fixing section and a width of the second front end region in the second fixing section are respectively smaller than a width of the insert.

4. The cutting tool according to claim 2, wherein the head member comprises a head front end region holding the insert and a head rear end region located closer to the first fixing hole, and a width of the head front end region is smaller than a width of the insert.

5. The cutting tool holder according to claim 1, wherein
the at least one through hole comprises a first through hole and a second through hole, and the at least one hole portion comprises a first hole portion and a second hole portion, and
a central axis of the first through hole and a central axis of the first hole portion are eccentric to each other, and a central axis of the second through hole and a central axis of the second hole portion are eccentric to each other, and directions of their respective eccentricities are parallel to each other.

6. The cutting tool holder according to claim 1, wherein the directions of their respective eccentricities and a longitudinal direction of a groove constituting the first serration part are parallel to each other in a side view.

7. The cutting tool holder according to claim 1, wherein a groove constituting the second serration part extends in a perpendicular direction with respect to the head rear end region of the head member in a side view.

8. The cutting tool holder according to claim 1, wherein
the holder body further comprises a first lower protrusion corresponding to at least a portion of the first serration part which protrudes downward with respect to the holder rear end region of the holder body in a side view, and
the head member comprises a second lower protrusion corresponding to at least a portion of the second serration part which protrudes downward with respect to the head rear end region of the head member in a side view.

9. The cutting tool holder according to claim 8, wherein
the head member comprises an upper protrusion protruding upward with respect to the head rear end region in the head front end region in a side view, and
a rear end of the second lower protrusion is located close to the head rear end region of the head member as compared to a rear end of the upper protrusion in a side view.

10. The cutting tool holder according to claim 1, wherein
the at least one hole portion is located at the first serration part of the side surface, and
the at least one through hole is located at the second serration part of the first side surface.

11. A cutting tool holder, comprising:
a pressing member comprising a pressing part and an inserting part;
a holder body; and
a head member comprising
a first fixing section which is divided into a first front end region and a first rear end region, and comprises a first fixing hole configured to insert the inserting part of the pressing member and a contact part pressed by the pressing part of the pressing member, at a portion of a first surface close to the first front end region in reference to the first rear end region, and
a second fixing section divided into a second front end region and a second rear end region, wherein the first rear end region of the first fixing section and the second rear end region are connected to each other and a fixing space extending from the second rear end region to the second front end region is located between the second fixing section and a second surface different from the first surface in the first fixing section,
wherein
the contact part comprises a first contact portion located close to the first rear end region and a second contact portion located close to the first front end region in reference to a midpoint of the first fixing hole,
an area of the second contact portion is larger than an area of the first contact portion, and
the second fixing section further comprises a second fixing hole being continuous with the first fixing hole with the fixing space interposed therebetween.

12. A cutting tool holder, comprising:
a pressing member comprising:
a pressing part and an inserting part;
a holder body comprising a first fixing hole configured to insert the inserting part of the pressing member; and
a head member comprising
a first fixing section which is divided into a first front end region and a first rear end region, and comprises a contact part pressed by the pressing part of the pressing member, at a portion of a first surface close to the first front end region in reference to the first rear end region, and
a second fixing section divided into a second front end region and a second rear end region, wherein the first rear end region of the first fixing section and the second rear end region are connected to each other and a fixing space extending from the second rear end region to the second front end region is located between the second fixing section and a second surface different from the first surface in the first fixing section,
wherein
the contact part comprises a first contact portion located close to the first rear end region and a second contact portion located close to the first front end region in reference to a midpoint of the first fixing hole, and an area of the second contact portion is larger than an area of the first contact portion,
the holder body is divided into a holder front end region and a holder rear end region comprising a wide part protruding in a width direction with respect to the holder front end region in a top view, and the holder body comprises a first serration part and at least one hole portion on a side surface closer to the wide part in the holder front end region,
the head member further comprises a second serration part which is located on a first side surface and is engaged with the first serration part, and at least one through hole extending from the first side surface to a second side surface located opposite the first side surface, in which a head rear end region is contacted with an end portion of the wide part closer to the holder front end region,
the cutting tool holder further comprises a fixing member lying from inside of the at least one hole portion to inside of the at least one through hole, and
a central axis of the at least one through hole is eccentric to the holder front end region of the holder body with respect to a central axis of the at least one hole portion.

13. The cutting tool holder according to claim 12, wherein the first fixing section comprises a first contact region in which the pressing part and the first surface are overlapped with each other, and the holder body comprises a second contact region in which the pressing part and the holder body are overlapped with each other, in a perspective view from the first surface of the first fixing section, and the first contact region is located at a higher position than the second contact region in a side view.

14. A cutting tool, comprising:
the cutting tool holder according to claim 12; and
an insert comprising a fixed part contacted with the first fixing section and the second fixing section in the fixing space, and a cutting part located outward of the first front end region as compared to the fixing space.

15. The cutting tool holder according to claim 12, wherein
the at least one through hole comprises a first through hole and a second through hole, and the at least one hole portion comprises a first hole portion and a second hole portion, and
a central axis of the first through hole and a central axis of the first hole portion are eccentric to each other, and a central axis of the second through hole and a central axis of the second hole portion are eccentric to each other, and directions of their respective eccentricities are parallel to each other.

16. The cutting tool holder according to claim 12, wherein the directions of their respective eccentricities and a longitudinal direction of a groove constituting the first serration part are parallel to each other in a side view.

17. The cutting tool holder according to claim 12, wherein a groove constituting the second serration part extends in a perpendicular direction with respect to the head rear end region of the head member in a side view.

18. The cutting tool holder according to claim 12, wherein
the holder body further comprises a first lower protrusion corresponding to at least a portion of the first serration part which protrudes downward with respect to the holder rear end region of the holder body in a side view, and
the head member comprises a second lower protrusion corresponding to at least a portion of the second serration part which protrudes downward with respect to the head rear end region of the head member in a side view.

19. The cutting tool holder according to claim 18, wherein the head member comprises an upper protrusion protruding upward with respect to the head rear end region in the head front end region in a side view, and a rear end of the second lower protrusion is located close to the head rear end region of the head member as compared to a rear end of the upper protrusion in a side view.

20. The cutting tool holder according to claim 12, wherein
the at least one hole portion is located at the first serration part of the side surface, and
the at least one through hole is located at the second serration part of the first side surface.

\* \* \* \* \*